Oct. 30, 1962 J. W. WARD 3,060,790

COLORIMETER AND COLOR SORTING APPARATUS

Filed Feb. 2, 1959 16 Sheets-Sheet 1

John W. Ward INVENTOR.

John W. Ward INVENTOR.

John W. Ward INVENTOR.

John W. Ward INVENTOR.

John W. Ward INVENTOR.

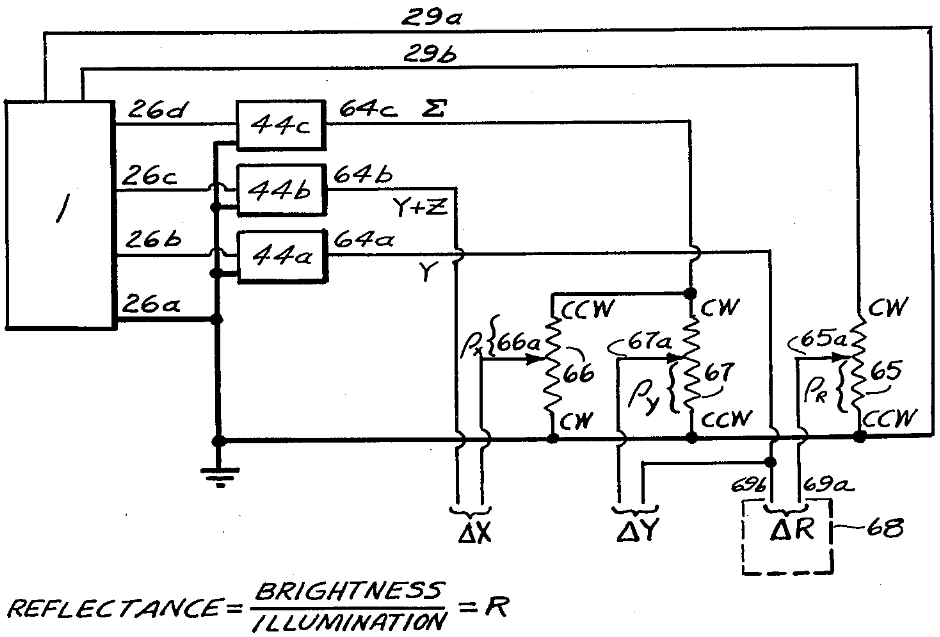

REFLECTANCE $= \frac{\text{BRIGHTNESS}}{\text{ILLUMINATION}} = R$

REFERENCE VOLTAGE = ILLUMINATION = $r$

BRIGHTNESS = $Y$ $\therefore R = \frac{Y}{r}$

BUT $\rho_R(r) = Y$ WHEN $\Delta R = 0$ $\therefore R = \frac{\rho_R(r)}{r} = \rho_R$ VALUE OF $x = \frac{X}{X+Y+Z} = \frac{X}{\Sigma}$ BUT $\rho_x \Sigma = X$ WHEN $\Delta X = 0$ $\therefore$ VALUE OF $x = \frac{\rho_x \Sigma}{\Sigma} = \rho_x$ VALUE OF $y = \frac{Y}{\Sigma}$ BUT $\rho_y \Sigma = Y$ WHEN $\Delta Y = 0$ $\therefore$ VALUE OF $y = \frac{\rho_y \Sigma}{\Sigma} = \rho_y$

FIG. 7

John W. Ward INVENTOR.

Oct. 30, 1962 J. W. WARD 3,060,790

COLORIMETER AND COLOR SORTING APPARATUS

Filed Feb. 2, 1959 16 Sheets-Sheet 7

AMERICAN STANDARD CHROMATICITY DIAGRAM

John W. Ward INVENTOR.

John W. Ward INVENTOR.

Oct. 30, 1962 J. W. WARD 3,060,790

COLORIMETER AND COLOR SORTING APPARATUS

Filed Feb. 2, 1959 16 Sheets-Sheet 9

| SORT TYPE | | SORTER ARRANGEMENT | | | SPECIAL CONDITIONS | REJECT SOURCE |
|---|---|---|---|---|---|---|
| | | A SORTER | B SORTER | C SORTER | | |
| 1 | XYR (3D) | X | Y | R | NONE | 1 |
| 2 | XXY (2D) | X | X | Y | ΔA<ΔB | 2 |
| 3 | XXR (2D) | X | X | R | ΔA<ΔB | 2 |
| 4 | YYX (2D) | Y | Y | X | ΔA<ΔB | 2 |
| 5 | YYR (2D) | Y | Y | R | ΔA<ΔB | 2 |
| 6 | RRX (2D) | R | R | X | ΔA<ΔB | 2 |
| 7 | RRY (2D | R | R | Y | ΔA<ΔB | 2 |
| 8 | XXX (1D) | X | X | X | ΔA<ΔB<ΔC | 3 |
| 9 | YYY (1D) | Y | Y | Y | ΔA<ΔB<ΔC | 3 |
| 10 | RRR (1D) | R | R | R | ΔA<ΔB<ΔC | 3 |

REJECT SOURCE 1:

REJECT = 3 ΔA OR 3ΔB OR 3ΔC

REJECT SOURCE 2:

$$REJECT = \frac{5\Delta B}{3} \text{ OR } 3\Delta C$$

REJECT SOURCE 3:

$$REJECT = \frac{7\Delta C}{5}$$

FIG. 10

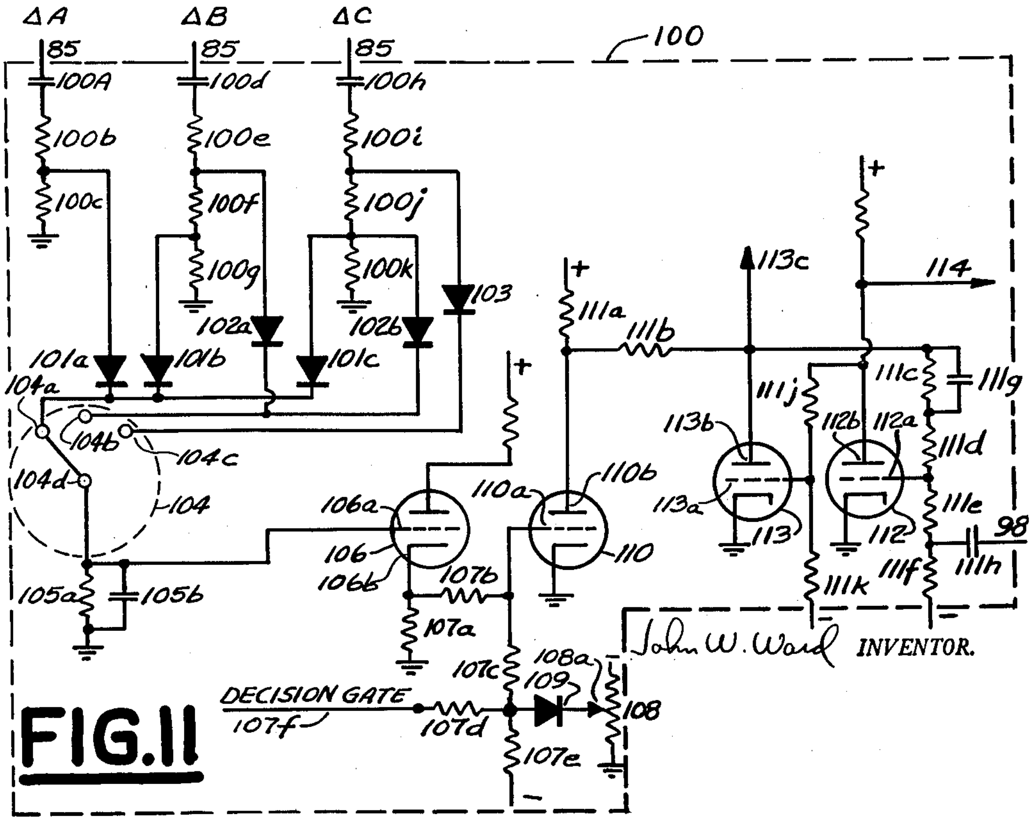

FIG. 11

John W. Ward INVENTOR.

John W. Ward INVENTOR.

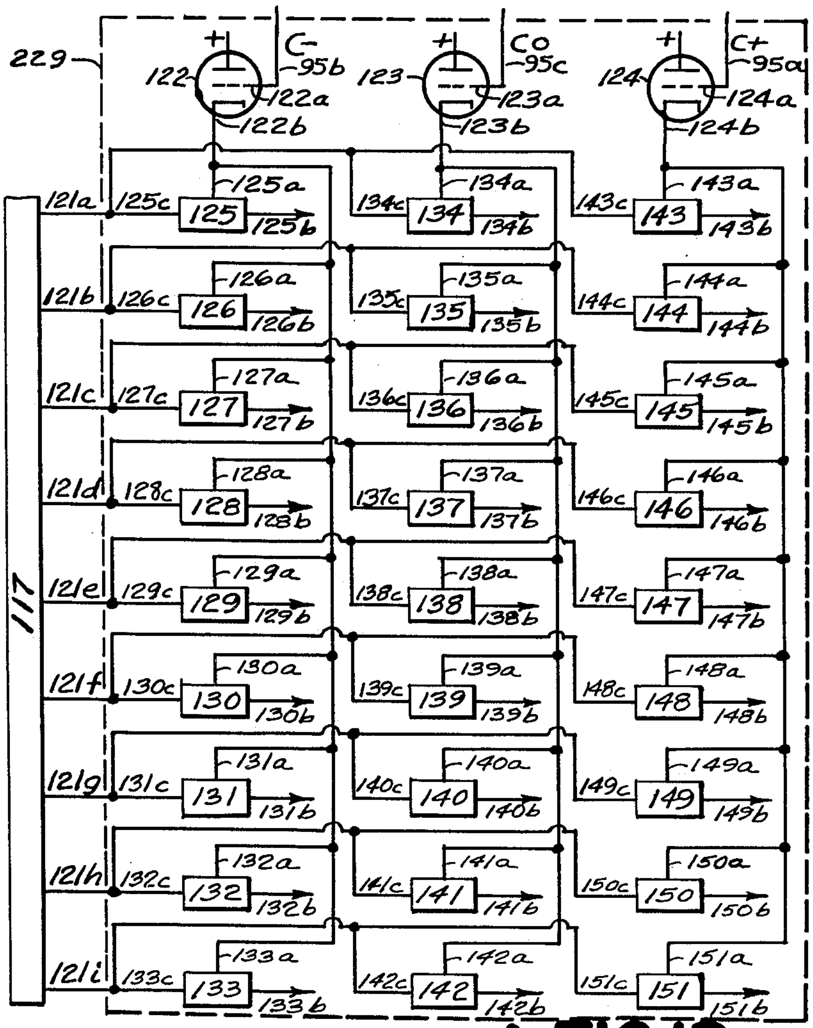
FIG. 13
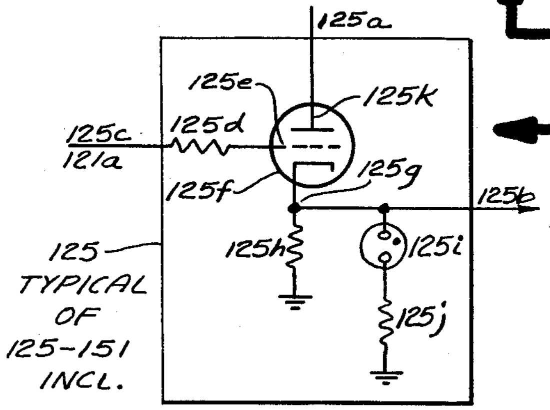
FIG. 13a
FIG. 13b
| SHADE NUMBER | ACTIVE OUTPUT | STORED DECISION FROM SORTER: SORTER A | SORTER B | SORTER C |
|---|---|---|---|---|
| 1 | 125 b | − | − | − |
| 2 | 126 b | 0 | − | − |
| 3 | 127 b | + | − | − |
| 4 | 128 b | − | 0 | − |
| 5 | 129 b | 0 | 0 | − |
| 6 | 130 b | + | 0 | − |
| 7 | 131 b | − | + | − |
| 8 | 132 b | 0 | + | − |
| 9 | 133 b | + | + | − |
| 10 | 134 b | − | − | 0 |
| 11 | 135 b | 0 | − | 0 |
| 12 | 136 b | + | − | 0 |
| 13 | 137 b | − | 0 | 0 |
| 14 | 138 b | 0 | 0 | 0 |
| 15 | 139 b | + | 0 | 0 |
| 16 | 140 b | − | + | 0 |
| 17 | 141 b | 0 | + | 0 |
| 18 | 142 b | + | + | 0 |
| 19 | 143 b | − | − | + |
| 20 | 144 b | 0 | − | + |
| 21 | 145 b | + | − | + |
| 22 | 146 b | − | 0 | + |
| 23 | 147 b | 0 | 0 | + |
| 24 | 148 b | + | 0 | + |
| 25 | 149 b | − | + | + |
| 26 | 150 b | 0 | + | + |
| 27 | 151 b | + | + | + |
John W. Ward INVENTOR.

John W. Ward INVENTOR.

John W. Ward INVENTOR.

John W. Ward INVENTOR.

John W. Ward INVENTOR.

Oct. 30, 1962 J. W. WARD 3,060,790

COLORIMETER AND COLOR SORTING APPARATUS

Filed Feb. 2, 1959 16 Sheets-Sheet 16

John W. Ward INVENTOR.

3,060,790
Patented Oct. 30, 1962

3,060,790

COLORIMETER AND COLOR SORTING APPARATUS

John W. Ward, Charlottesville, Va., assignor to Specialties, Incorporated, Syosset, N.Y., organized and existing under the laws of the State of New York Filed Feb. 2, 1959, Ser. No. 790,581
11 Claims. (Cl. 88—14)

This invention relates to colorimeters, and, more particularly, to colorimeters which are direct reading, rapid in operation, and capable of providing control signals for use by automatic conveying machinery, thereby facilitating sorting of specimens in groups as a result of their color characteristics. The American Standards Association in Z58.7.1, .2, .3, the American Standard Methods of Measuring and Specifying Color, has established a precise mathematical method for describing chromaticity in terms of two rectangular co-ordinates, $x$ and $y$, suitable for direct plotting on the American Standard Chromaticity Diagram. With the addition of a third component, reflectance, a sample surface may be completely described in a rigorous fashion.

Instrumentation which would be rapid, yet simple, in operation and capable of the extreme accuracy and reliability required for both laboratory and industrial use has not been available in the past. This deficiency has caused those industries and research organizations requiring precise color control to rely upon manual human color analysis. However, manual analysis is costly and often, because of uncontrollable physiological factors, fails to yield the degree of accuracy and consistency which is sought.

It is therefore one object of the present invention to provide an apparatus for rapidly determining the chromaticity and reflectance of an unknown sample in accordance with absolute mathematical standards.

Another object of the present invention is to provide an apparatus which yields readings or numerical values which are indicative of absolute color characteristics, yet is simple in operation.

An additional object of the present invention is to provide an apparatus whereby the numerical values of chromaticity and reflectance are in accordance with the American Standard Methods of Measuring and Specifying Color, Z58.7.1, .2, .3.

Yet another object of the present invention is to provide an apparatus which will rapidly analyze the color characteristics of an unknown sample and compare them with preset mathematical standards retained within this apparatus.

A further object of the present invention is to provide an apparatus which is capable of utilizing variations in chromaticity and reflectance, from the preset mathematical standards contained within the apparatus, to determine shade variations between individual samples.

Still another object of the present invention is to provide an apparatus which will initiate an output or control signal for the purpose of subsequently grouping samples of the same shade together and separating these from those of a different shade.

Yet another object of the present invention is to provide an apparatus which will perform each or all of the preceding functions with accuracy, reliability and rapidity, thereby making the apparatus suitable for automatic color inspection and grading at production rates which are economically justifiable and compatible with industrial and other requirements.

In accordance with the present invention, a sensor is provided which, by means of photoelectric transducers, generates an electrical analogy of the three ASA Tristimulus Values of the energy emitted from, radiated by or reflected from the surface being examined. The sensor also provides light sources and suitable modifying filters to adequately illuminate the sample surface while it is being examined. A sampling device provides an electrical analogy of the sample surface illumination in order to provide for absolute accuracy and stability. Utilizing the analog signals thus derived, the apparatus then computes by means of comparator circuits the "Value of $x$," and "Value of $y$" in accordance with the American Standard Methods of Measuring and Specifying Color. Sample surface reflectance is also computed. As a result of this computation of "Value of $x$," "Value of $y$" and Reflectance, an absolute color analysis of the specimen is obtained.

Direct readings of the chromaticity characteristics are obtainable in accordance with this invention by means of computing potentiometers which can be calibrated directly in the numerical "Value of $x$" and "Value of $y$" for any sample within the realm of the American Standard Chromaticity Diagram. Manual adjustment of the "Value of $x$," "Value of $y$" and Reflectance computing potentiometers to obtain a zero voltage difference between their respective sliding contacts and the appropriate electrical analog voltages obtained from the sensor, will afford a direct measurement of the chromaticity and reflectance of the sample.

When the apparatus is utilized to sort or separate colored specimens these computing potentiometers may be preset to the desired nominal values of chromaticity and reflectance. Variations between the electrical analog voltages obtained from the sensor and the voltages derived from the computer potentiometers may then be resolved into positive or negative errors between the preset and actual "Value of $x$," "Value of $y$" and Reflectance. These error signals, if desired, may be amplified and made to operate a polarity and magnitude sensitive error detector. Three such error detectors, utilized in their various combinations, and functioning in two chromaticity axes and reflectance, can be shown to yield 27 unique conditions. These variations or combinations of variations are subsequently called shades.

Suitable switching circuits are also provided in which two of the three variables of chromaticity and reflectance may be used to yield fifteen shades. Additional switching circuits are provided which will permit decisions based on a single variable in chromaticity or reflectance, in which case seven possible shades exist.

Recombination of these shades may be made in this invention so that certain combinations or shades may be grouped in a manner under complete control of the operator. As a result of these shade combinations a series of seven shade groups or sorts can be used to initiate a series of sort output signals. These sort signals may subsequently be used, through this invention, for the purpose of controlling the conveying or handling of the specimens, either manually or automatically, to provide the desired laboratory or production color sort grouping.

The above and other features and objects of the present invention will be apparent to those skilled in the art from the following specification which will describe one preferred embodiment of the invention and which will refer to the accompanying drawings, in which:

FIGURE 3 is composed of:

Figure 3:
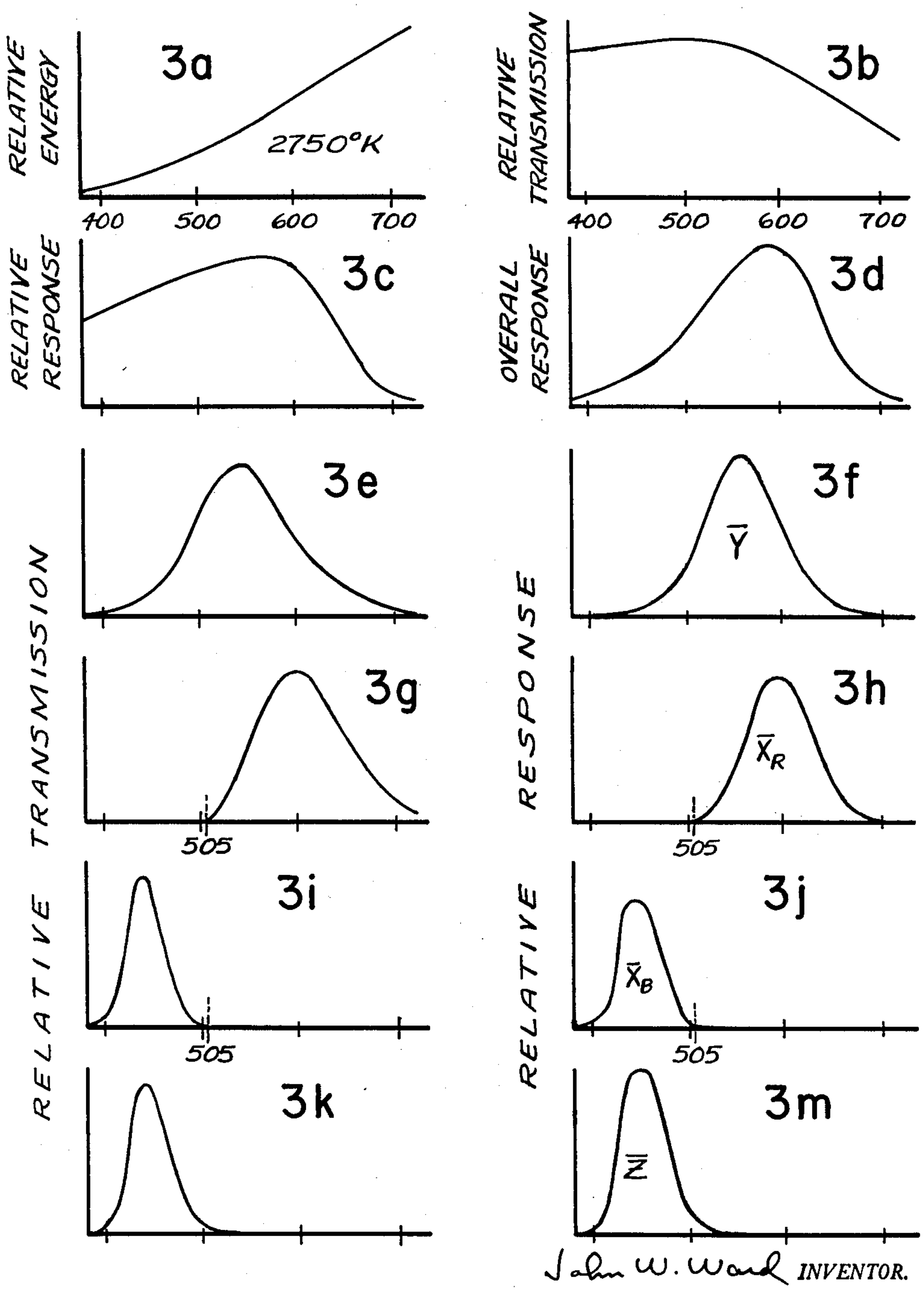

FIGURE 3*a*, the spectral energy distribution of the light source.

FIGURE 3*b*, the transmission characteristic of the infrared absorbing filter.

FIGURE 3*c*, the spectral sensitivity of a photovoltaic cell.

FIGURE 3*d*, a composite curve including the characteristics of the light source, infrared absorbing filter and photocell.

FIGURES 3*e*, 3*g*, 3*i* and 3*k*, which respectively show the desired transmission characteristics of a series of color separation filters which, when used with the preferred light source, infrared absorbing glass and photocell will produce sensors with overall spectral sensitivities as shown in FIGURES 3*f*, 3*h*, 3*j* and 3*m* respectively.

Figure 4:
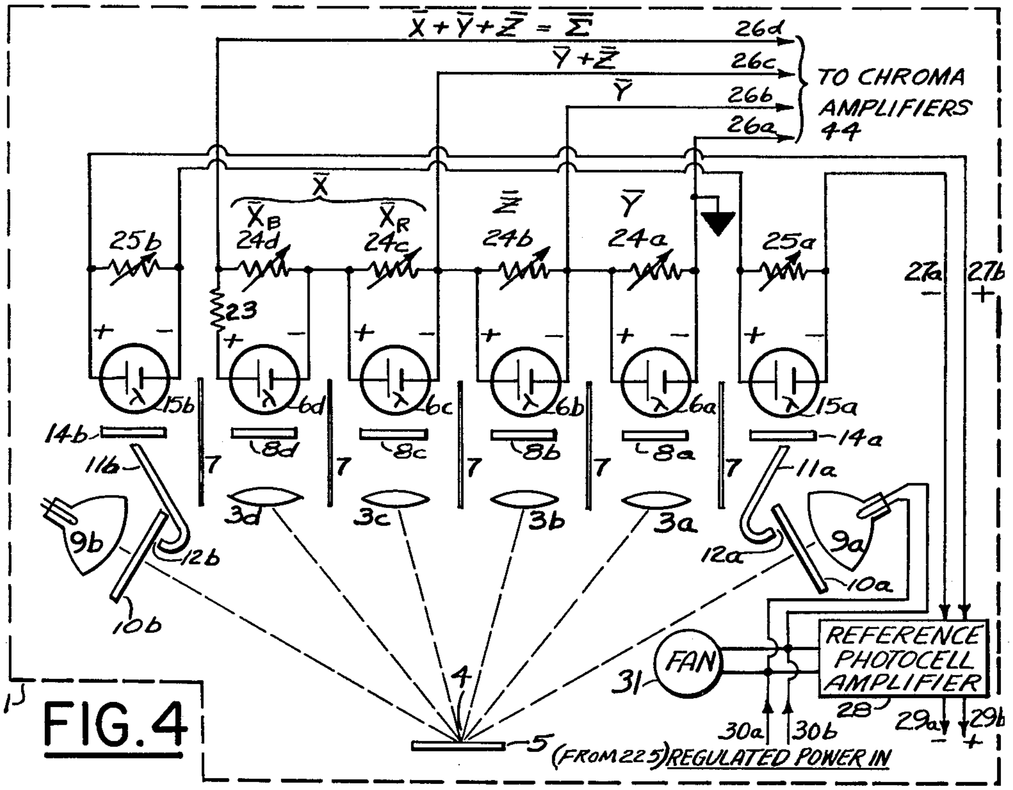

FIGURE 4 is an electrical diagram of the Sensor.

Figure 5:
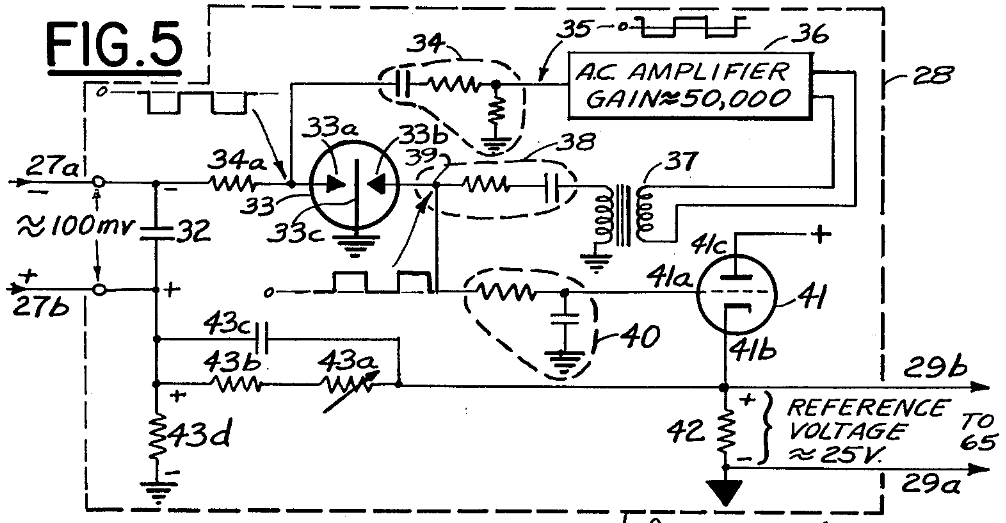

FIGURE 5 is an electrical diagram of the Reference Photocell Amplifier.

Figure 5A:
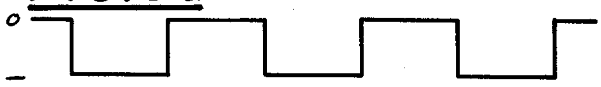

FIGURE 5*a* indicates a low voltage square wave which may occur in connection with the circuit of FIGURE 5.

Figure 6:
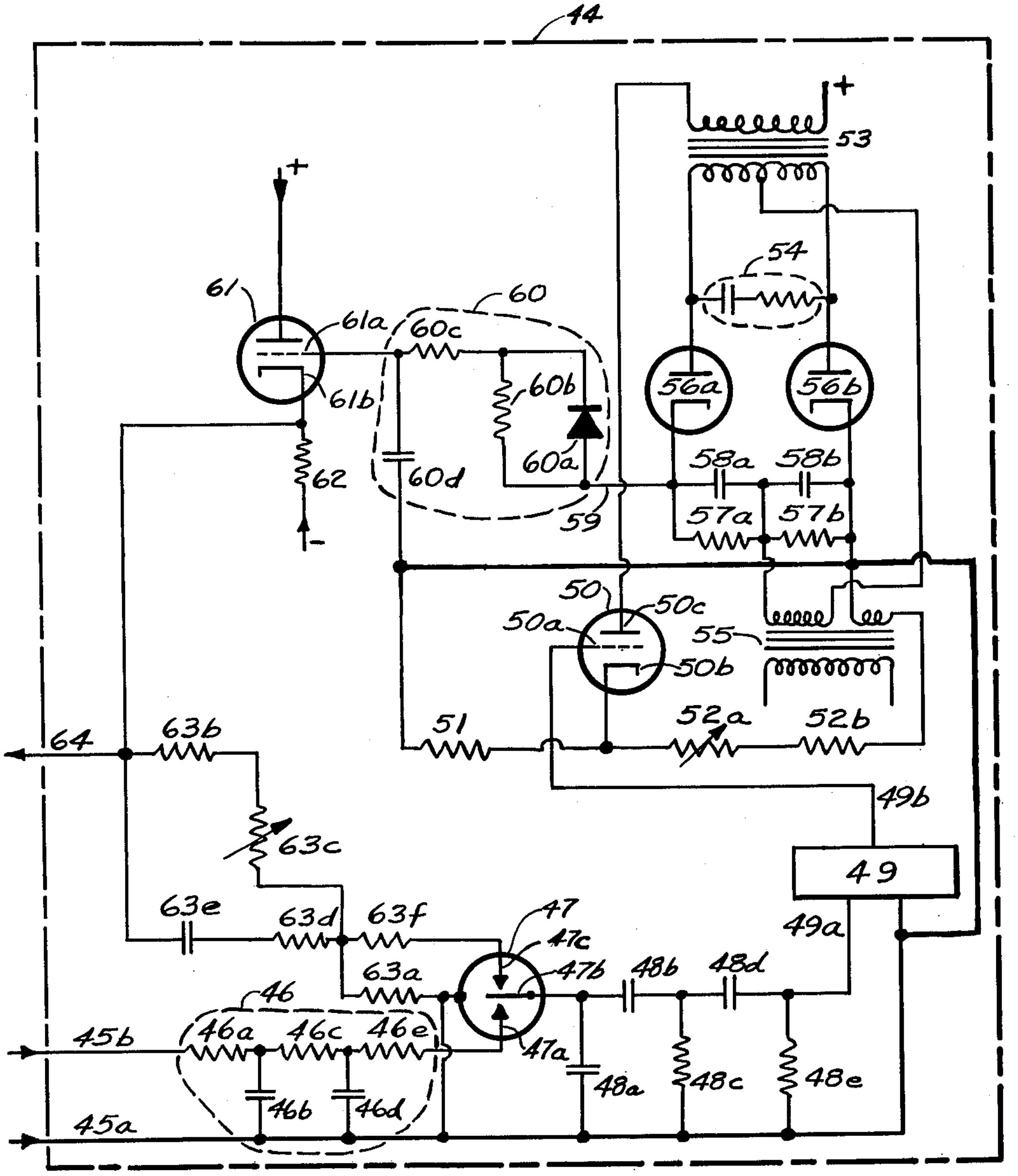

FIGURE 6 is an electrical diagram of an amplifier, subsequently referred to as a Chroma Amplifier, which is used to amplify the individual photocell signals for subsequent computation.

Figure 6A:

FIGURE 6*a* indicates a low voltage square wave which may occur in connection with the circuit of FIGURE 6.

FIGURE 7 is a combined block and electrical diagram showing the method of chromaticity computation utilizing the electrical analog information obtained from the Sensor, three Chroma Amplifiers and computer potentiometers.

Figure 8:
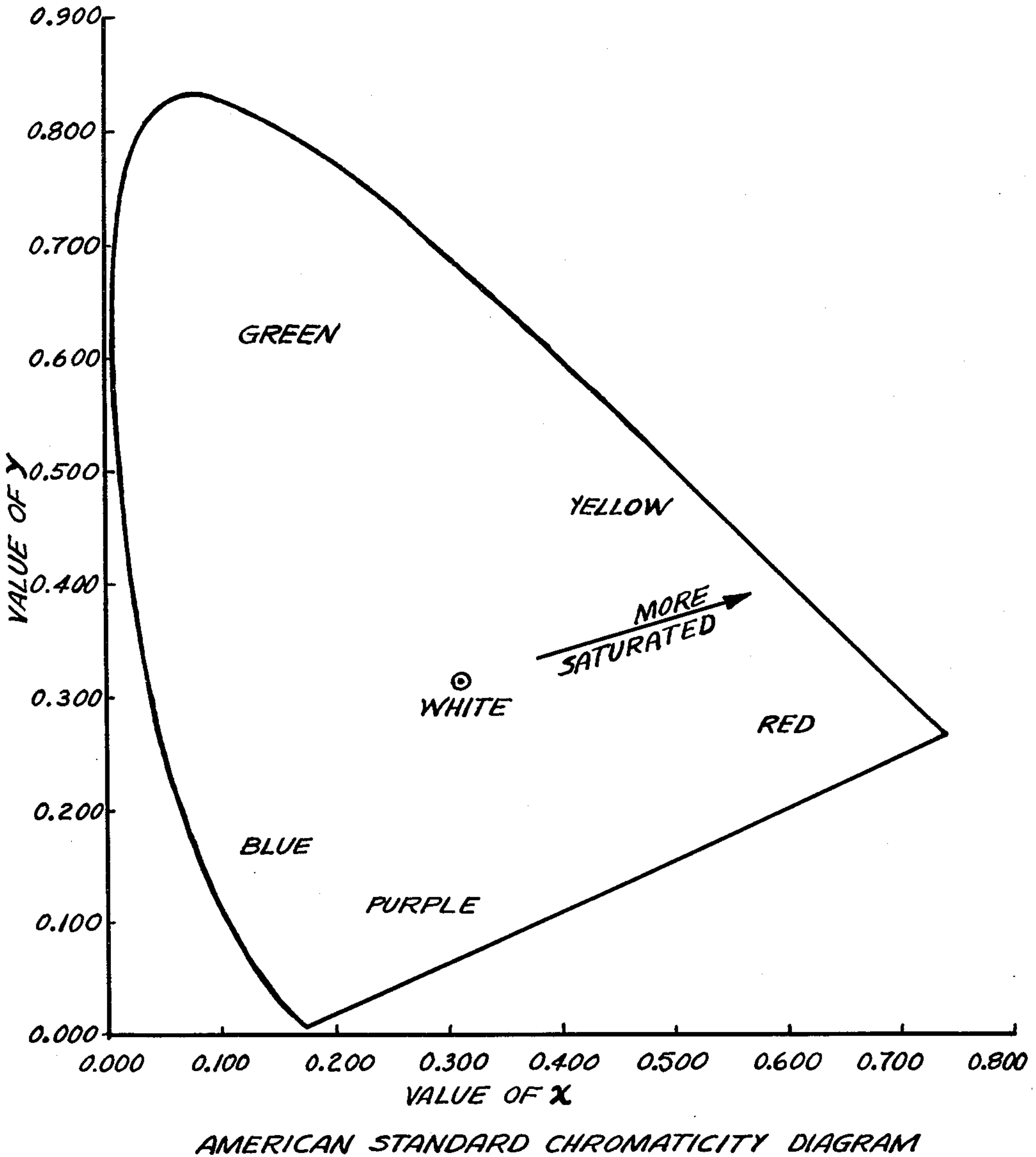

FIGURE 8 is the American Standard Chromaticity Diagram.

Figures 9, 9A, 9B, 9C, 9D, 9E, 9F:
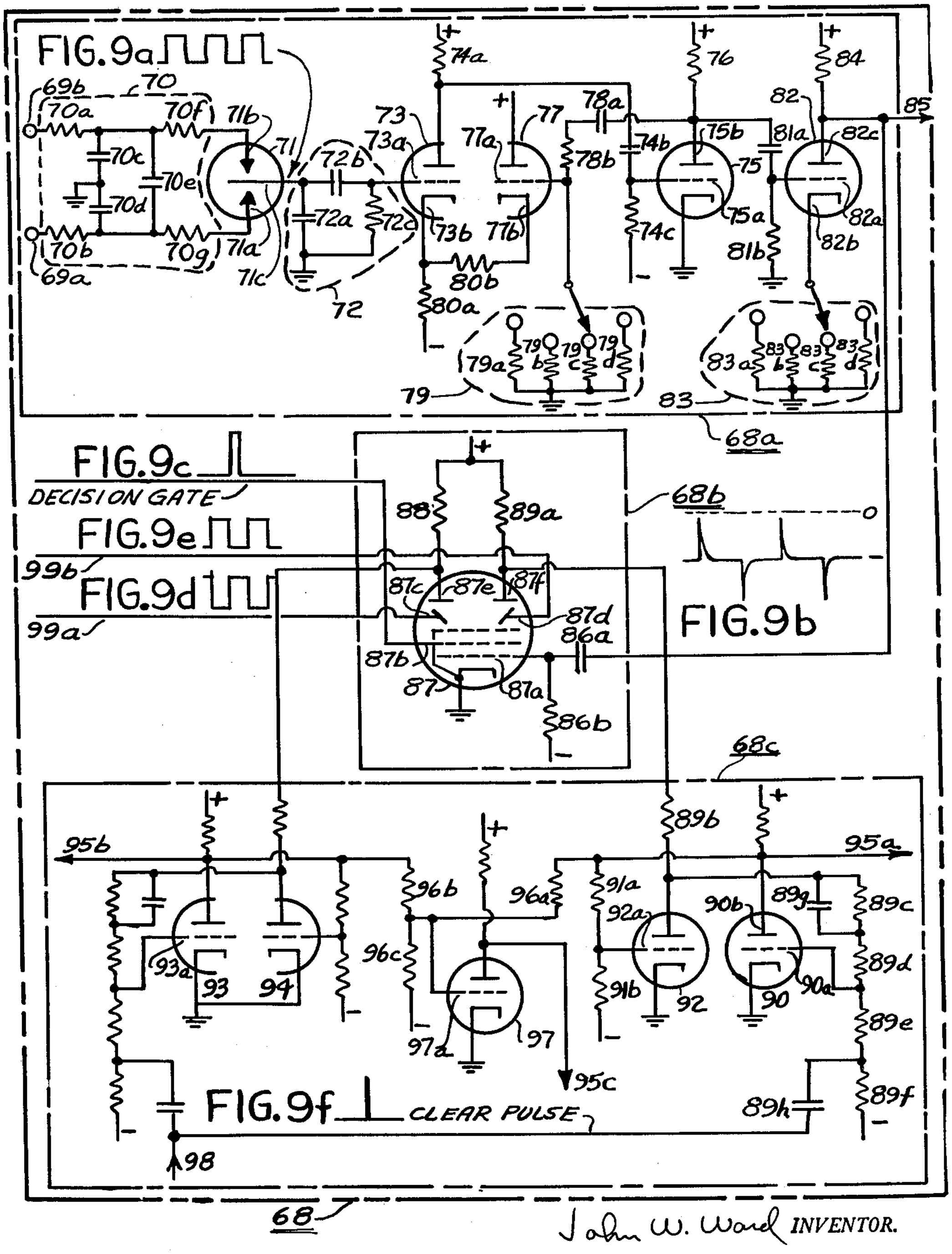

FIGURE 9 is an electrical diagram of an error amplifier, polarity and amplitude sensitive detector, and series of storage elements which, in conjunction, are called a Sorter.

FIGURES 9*a*, 9*b*, 9*c*, 9*d*, 9*e* and 9*f* depict the various wave forms which may occur in the circuit of FIGURE 9.

FIGURE 10 is a chart showing the various combinations in which chromaticity and reflectance signals may be switched among the three Sorters.

FIGURE 11 is an electrical diagram of an Error Divider, gated Reject Detector and storage element.

Figure 12:
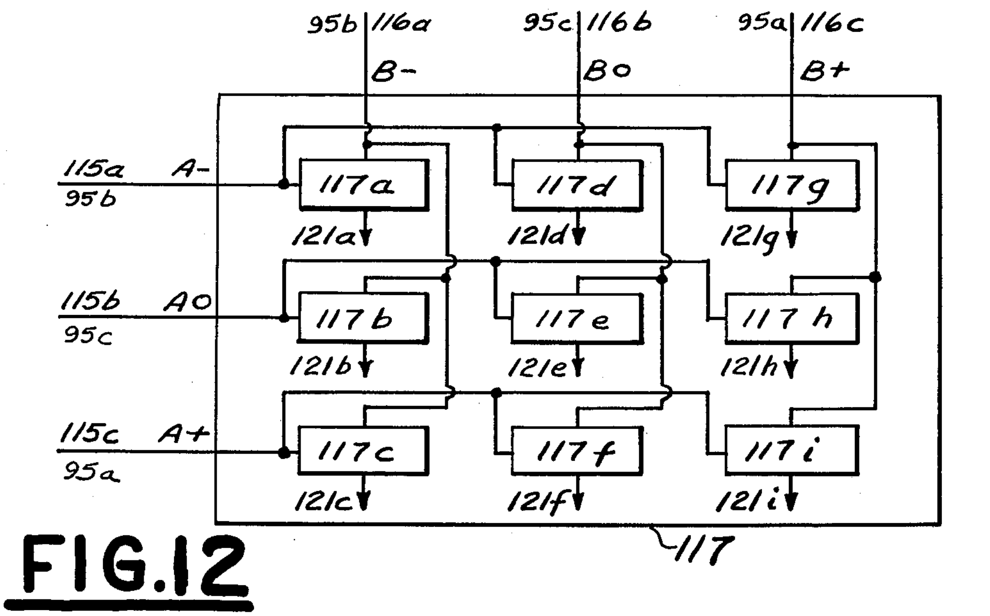

FIGURE 12 is a block diagram of a network referred to as a Shade Matrix.

Figure 12A:
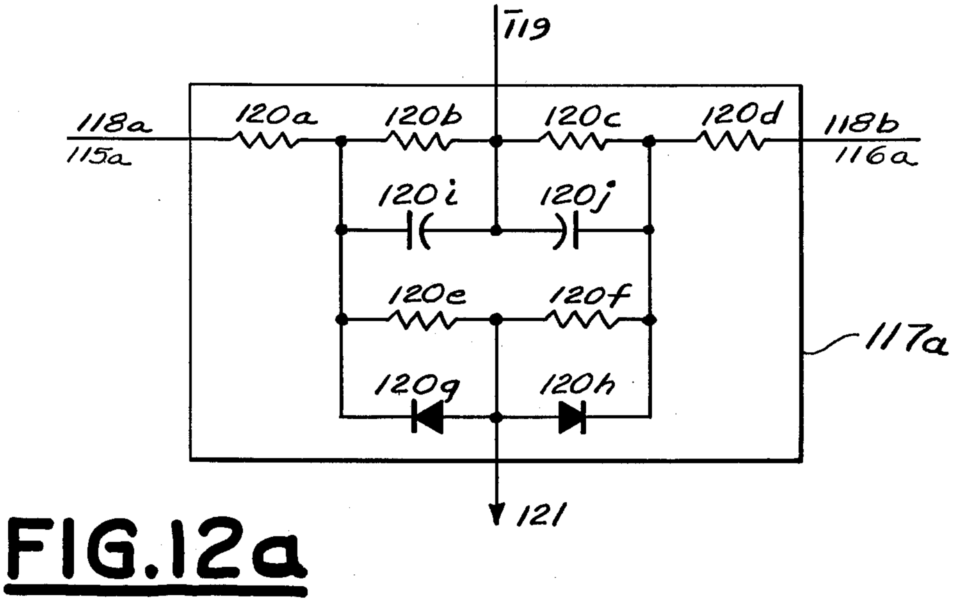

FIGURE 12*a* is a partial schematic of one element of the Shade Matrix, FIGURE 12.

FIGURE 13 is a block diagram and partial schematic of a device referred to as a Shade Matrix Amplifier.

FIGURE 13*a* is a partial schematic of one element of the Shade Matrix Amplifier, FIGURE 13.

FIGURE 13*b* is a chart depicting the various combinations of Sorter decisions which result in the 27 shades.

Figures 14, 14A:
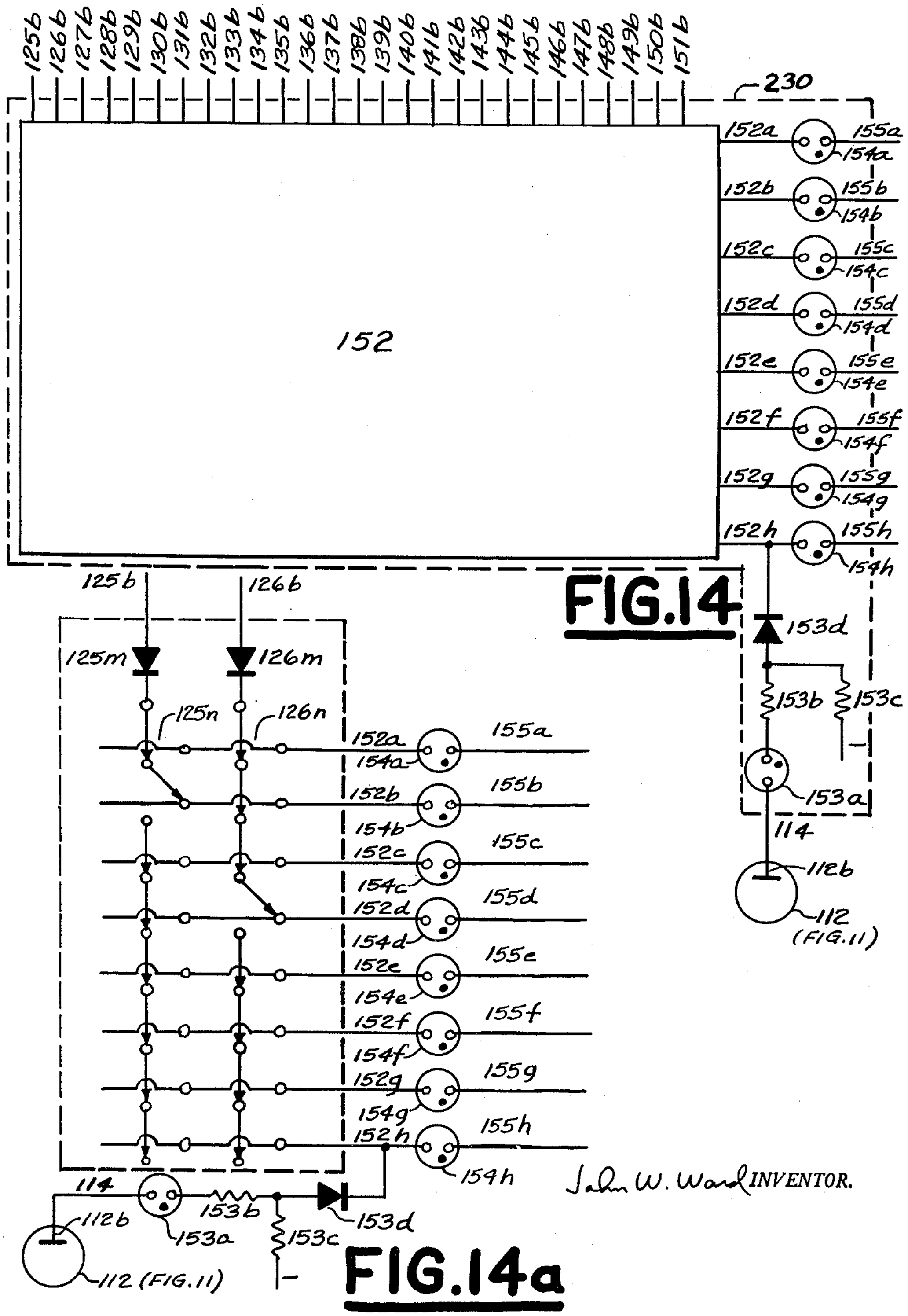

FIGURE 14 is a block diagram of a switching assembly referred to as a Shade-Sort Matrix.

FIGURE 14*a* is a detail of two of the switches used in the Shade-Sort Matrix, FIGURE 14.

Figure 15:
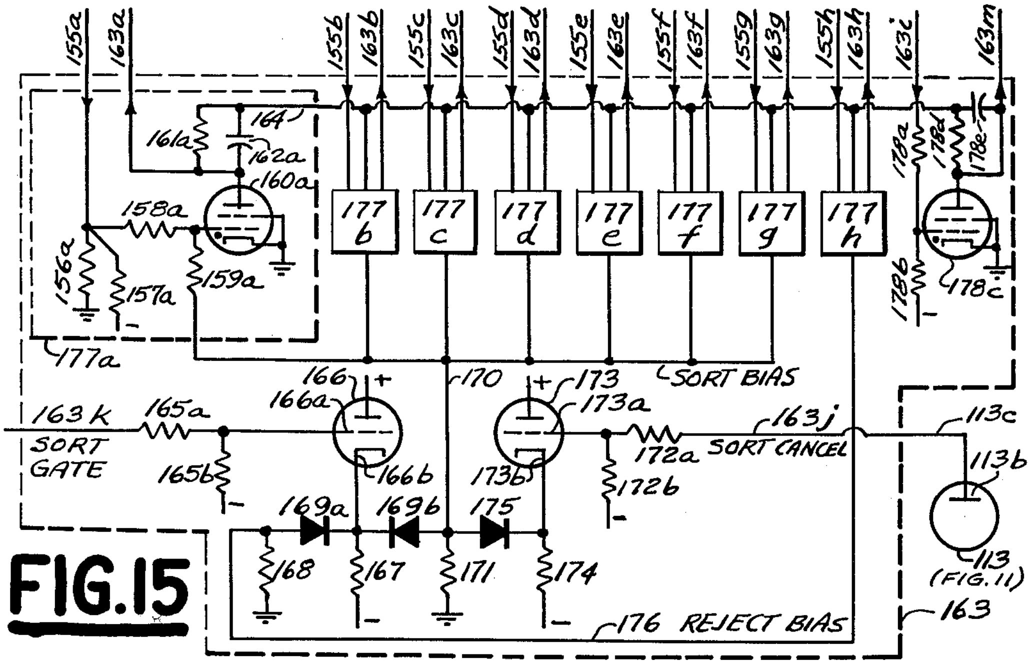

FIGURE 15 is an electrical diagram of one type of Classifier and sort cancelling circuit using thyratrons as the output power signal source.

Figure 16:
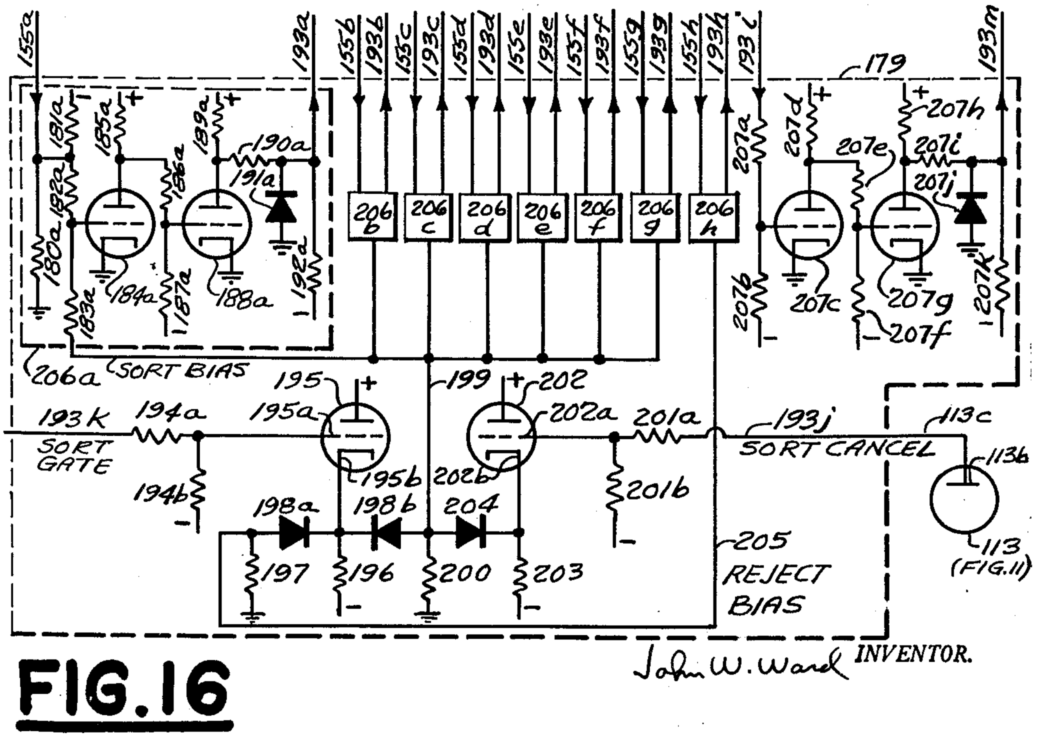

FIGURE 16 is an electrical diagram of a Classifier and sort cancelling circuit utilizing vacuum tubes as the output voltage signal source.

Figure 17:
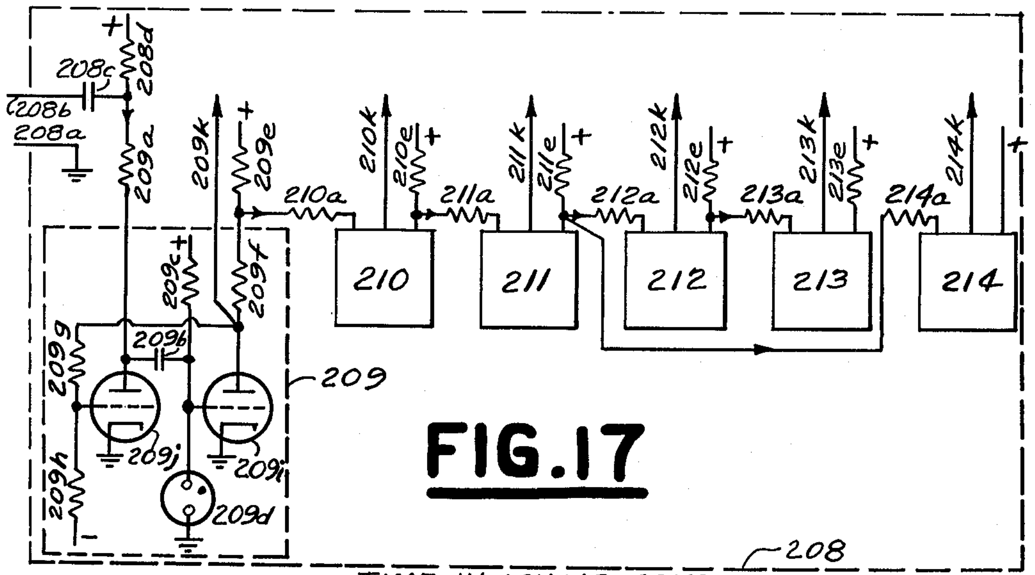

FIGURE 17 is an electrical diagram of one type of sequencing circuit hereafter called a Sequencer.

Figure 17A:
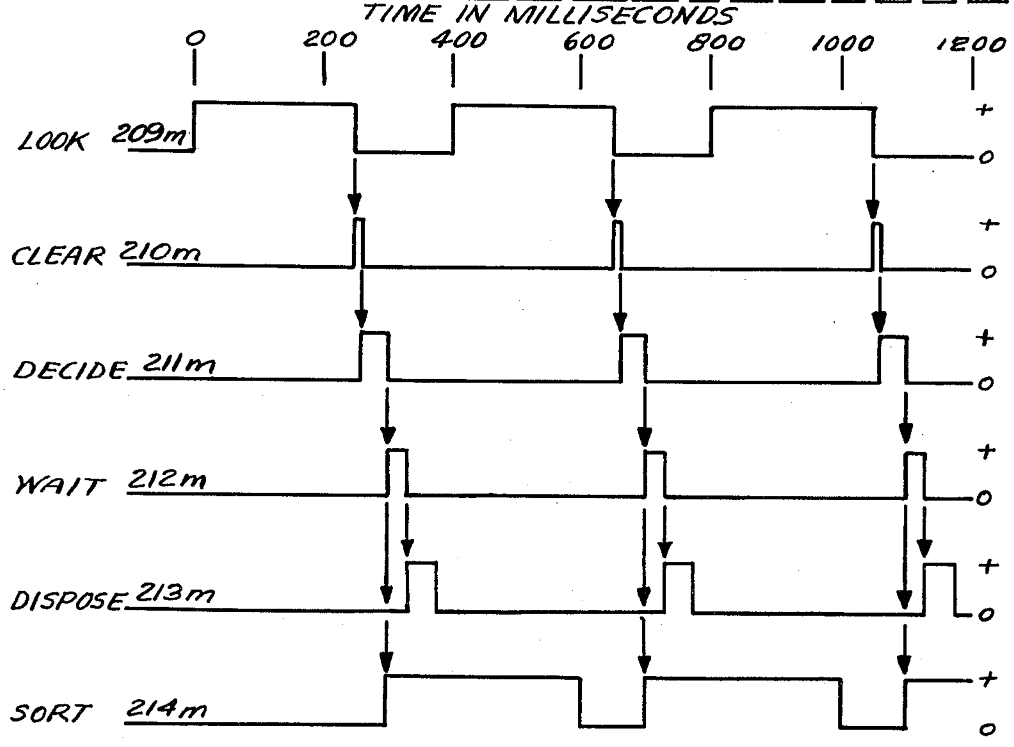

FIGURE 17*a* depicts the control action of this sequencer on a time basis.

Figure 18:
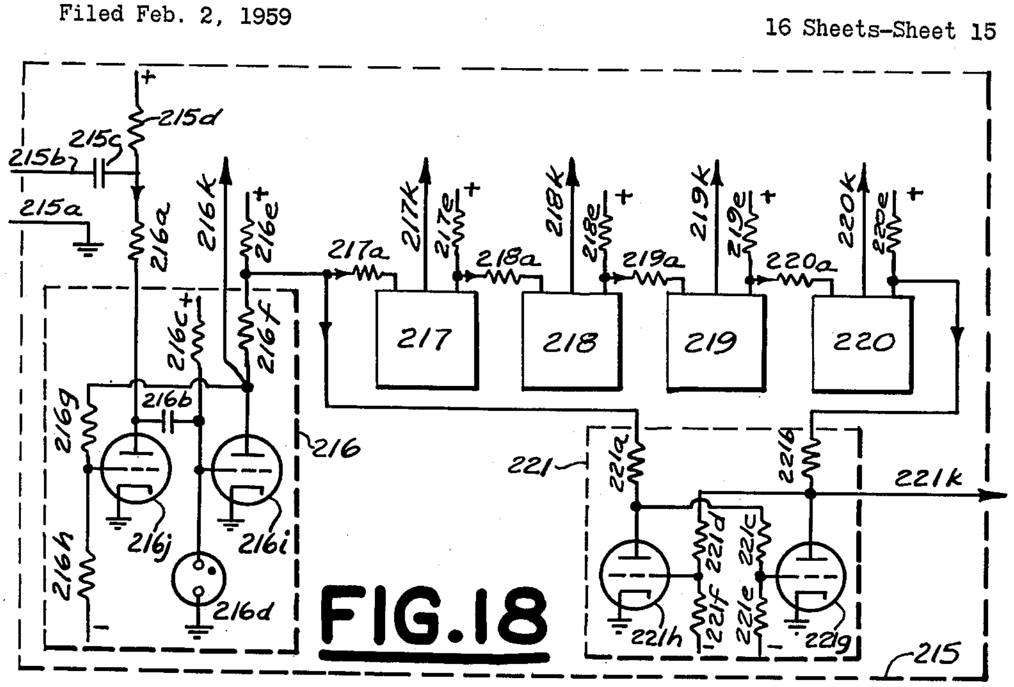

FIGURE 18 is an electrical diagram of a second type of Sequencer.

Figure 18A:
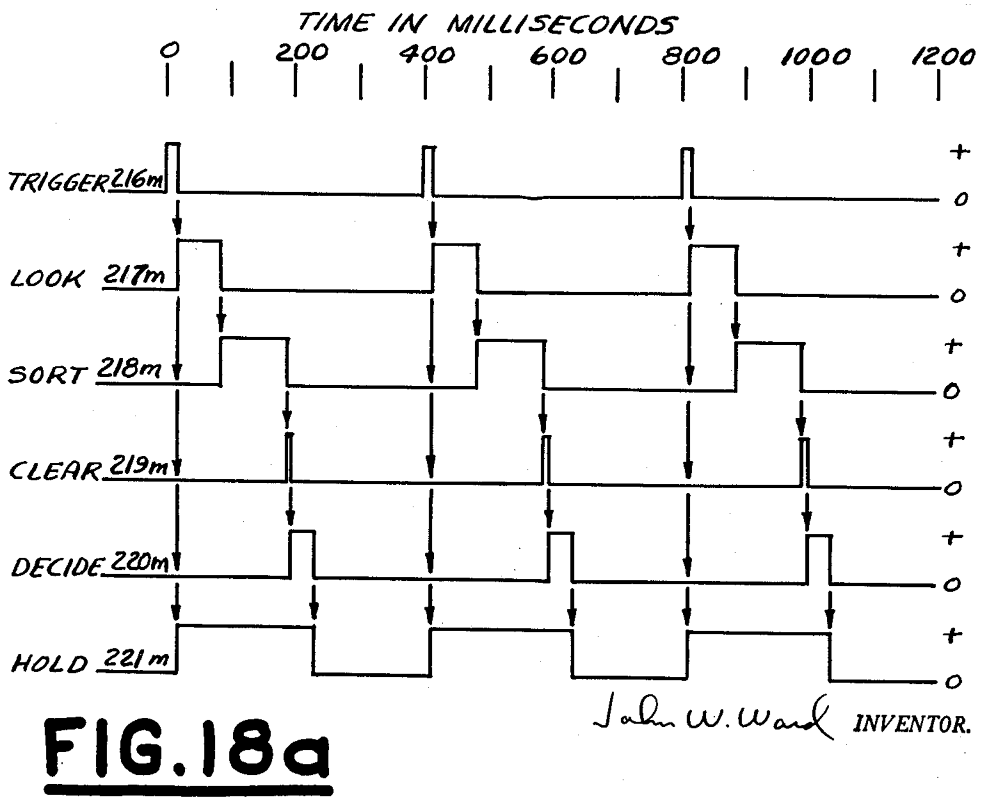

FIGURE 18*a* depicts the control action of this Sequencer on a time basis.

Figure 19:
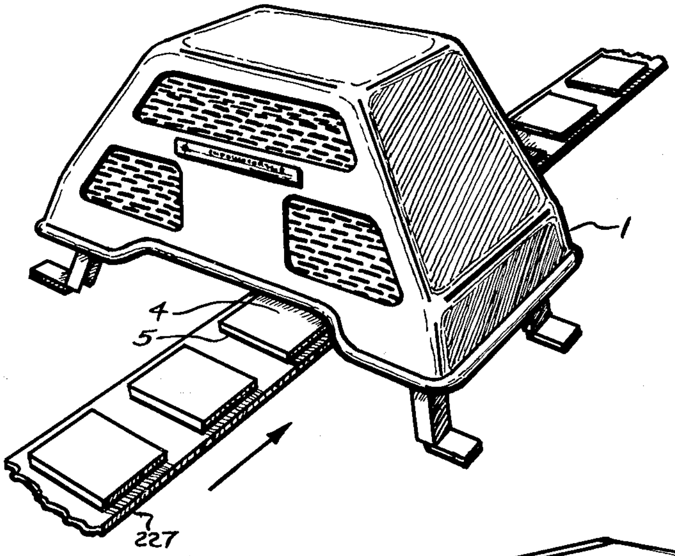

FIGURE 19 is a perspective view of the Chromosorter or colorimeter sensing head and a belt shown in fragmentary manner and carrying tiles under the sensing head.

Figure 20:
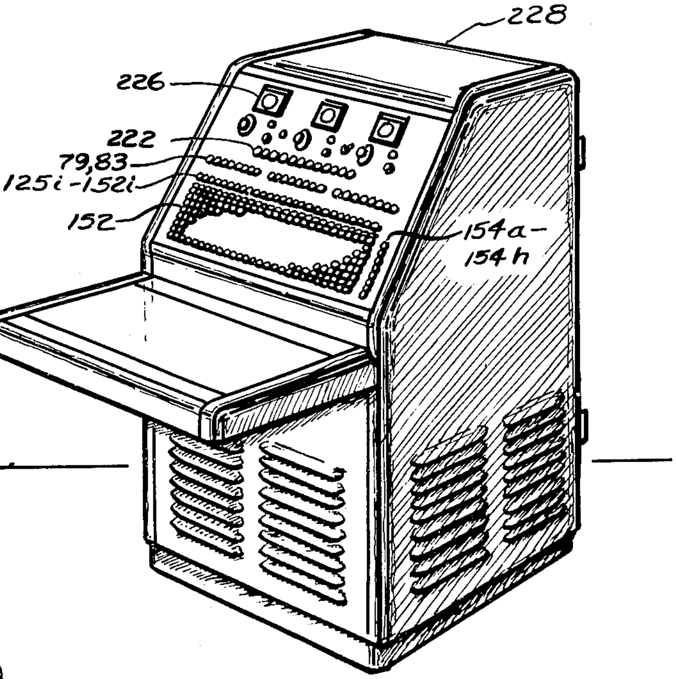

FIGURE 20 is an overall preferred mechanical configuration of the Sensor and Console which, in conjunction, provide one preferred configuration of this invention.

Figure 1:
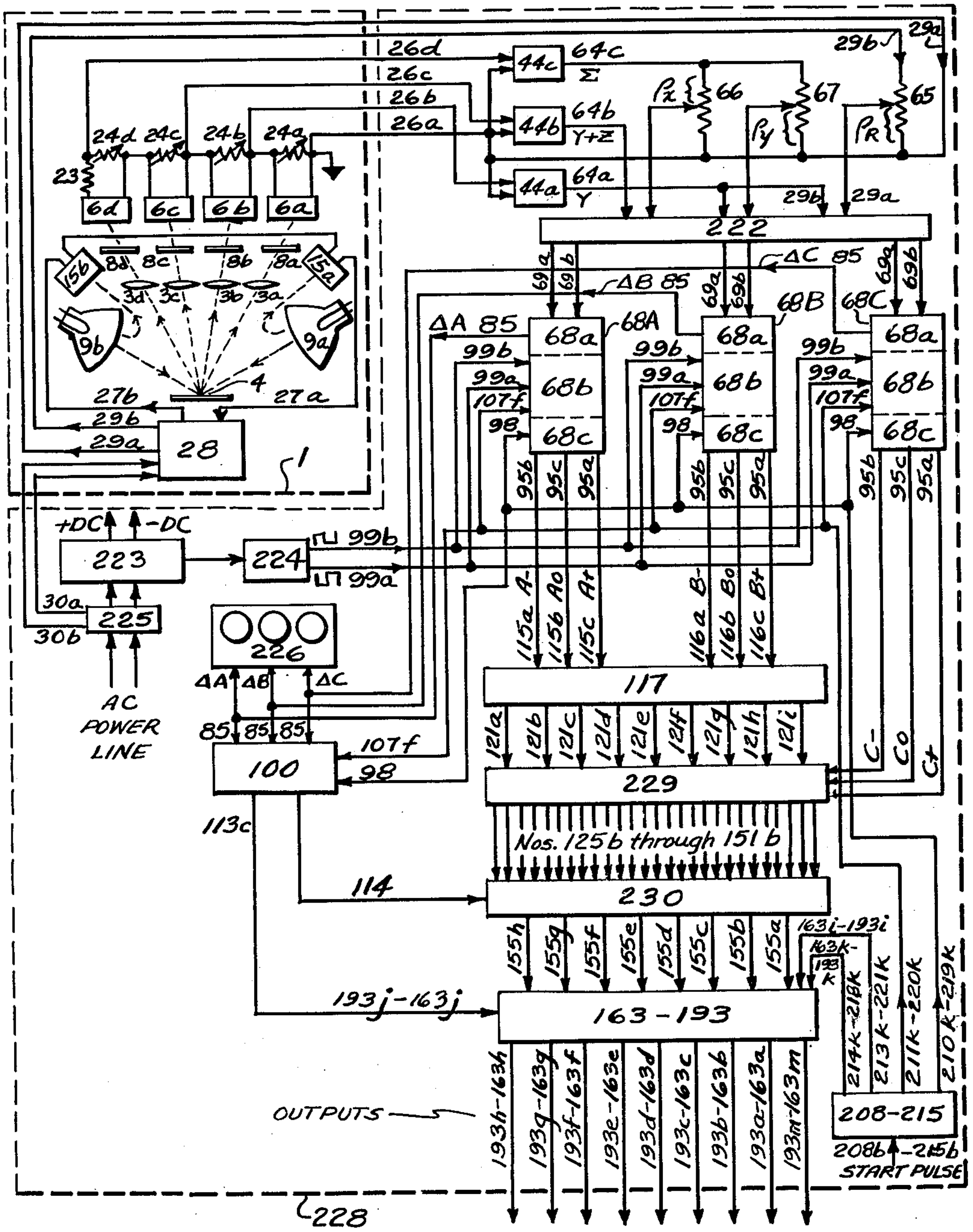
FIGURE 1 is a block diagram of a Colorimeter and Automatic Color Sorting Apparatus.

Reference to FIGURE 1, the system block diagram, throughout the following description will permit ready understanding of the logical sequence of operations performed by the apparatus and methods which are the subjects of this invention. The apparatus is in two main assemblies, the Sensor and the Console.

In the following description certain components have been assumed to be of a common nature and, therefore, are not described in detail.

The sort selector switch 222 in block diagram FIGURE 1 provides the switching function shown in chart form in FIGURE 10.

The power supply 223 in FIGURE 1 provides regulated negative and positive D.C. power to the various components and to conductors labeled (+) and (−) in the various figures.

The square wave generator 224 FIGURE 1 provides synchronizing voltage for the deflection electrodes 87*c* and 87*d* of the tube 87, FIGURE 9.

A regulating transformer 225 FIGURE 1 provides regulated A.C. voltage for all requirements.

A three channel oscilloscope 226 monitors the amplified error voltages of the three sorters 68.

Figure 2:
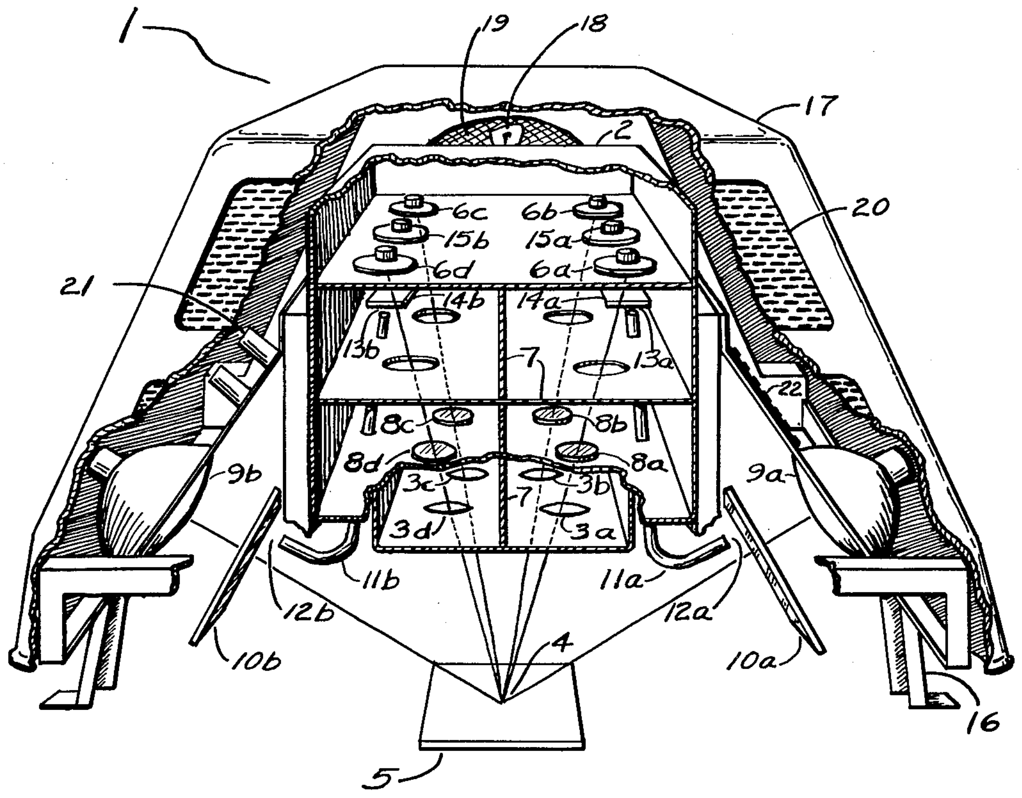
FIGURE 2 is a preferred configuration of the Sensor showing details of the optical system and mechanical arrangement of components.

Referring to FIGURE 2, there is illustrated one embodiment of the Sensor 1. A lens, photocell and filter arrangement generally shown as the numeral 2 contains four lenses, 3*a*, 3*b* 3*c*, and 3*d*, positioned to form an image of a portion of the sample surface 4, of the generalized sample 5, on the surfaces of four photoelectric cells or other photosensitive devices, 6*a*, 6*b*, 6*c* and 6*d*, suitably attached to the sensor framework. Baffle plates and apertures generally defined by numeral 7 are disposed within the lens-and-photocell-assembly 2 to insure that only that light coming from the sample surface 4 through lens 3*a* reaches photocell 6*a*, and that light from surface 4 passing through lens 3*b* reaches only photocell 6*b*, and similarly for lens 3*c* and associated photocell 6*c*, and lens 3*d* and photocell 6*d*.

Interposed between the various lenses and their corresponding photocells are a group of color separation filters. Filter 8*a* is in the 3*a*—6*a* optical path, 8*b* being in the 3*b*—6*b* optical path and so on. It is the nature of these color separation filters, which will be described, to separate the energy reflected from the sample surface 4 into its various components to permit subsequent chromaticity evaluation.

Two lamps 9*a* and 9*b*, illuminate the sample surface from an angle which obviates the possibility of direct specular reflection of the light sources into the photocell optical systems. Two infrared absorbing glass plates, 10*a* and 10*b*, remove the undesired infrared component from the incandescent lamp sources. The illumination reaching the sample 5 is thereby somewhat modified in its spectral energy distribution as compared with the energy distribution of its original incandescent source. Transparent sampling rods 11*a* and 11*b* are interposed in such manner as to intercept a small portion of the illumination of their respective lamps. These rods are made of transparent plastic, glass or other suitable material and are shaped as shown. By the nature of the total internal reflection intrinsic with high refractive index transparent materials, the illumination sample taken at the entrance apertures 12*a* and 12*b* of these rods, emerges from the upper end of the rods at 13*a* and 13*b*. After passing through suitable modifying filters 14*a* and 14*b* this energy impinges upon the photosensitive surface of two reference photocells 15*a* and 15*b*. As can be readily deduced, variations in illumination, reaching sample surface 4, have corresponding illumination variations at the photocell surfaces 15*a* and 15*b*.

The entire sensor assembly is mounted on a rigid frame 16 and provided with a protective cover 17 which obviates physical damage. A suction fan 18 draws external air through a dust filter 19, circulates it over the various optical and electronic components, and exhausts the air over the surfaces of the lamps 9*a* and 9*b* and the infrared absorbing filters 10*a* and 10*b*. An exhaust screen 20 is provided to permit ready interchange of air.

The reference photocell amplifier, generally referred to as 21 will subsequently be explained.

A terminal block 22 provides a convenient location for interconnections between the sensor components and external connections to the computer console. (All of these components are suitably mounted as illustrated by the drawing. See also FIGURE 4.)

The ability of this colorimeter and automatic color sorting apparatus to measure chromaticity in exact accordance with ASA Z58.7.1, .2, .3, the American Standard Methods of Measuring and Specifying Color, is due to the design of the color separation filters 8*a* through 8*d* and their co-ordination with the photocells 6*a* through 6*d*, the lamps 9*a* and 9*b* and the infrared absorbing filters 10*a* and 10*b*.

FIGURE 3*a* depicts the relative energy distribution versus wave length of an incandescent lamp source operating at a color temperature of approximately 2750° K.

FIGURE 3*b* depicts the energy transmission versus wave length of a typical infrared absorbing glass plate such as 10*a* and 10*b*.

FIGURE 3*c* indicates the relative response versus wave length of a typical photovoltaic cell such as those indicated by numerals 6*a* through 6*d* and 15*a* and 15*b*.

For convenience, FIGURE 3*d* shows a composite response characteristic which would result if an incandescent lamp source of 2750° K. color temperature, through the appropriate type of infrared absorbing glass, were to illuminate an appropriate type photovoltaic cell.

In order to produce the sensors required to perform tristimulus colorimetry in accordance with the American Standard Methods of Measuring and Specifying Color, this composite characteristic must be modified still further.

FIGURE 3*e* shows the transmission versus wave length characteristic of a suitable type color separation filter which would modify the composite characteristic 3*d* to produce the curve 3*f*.

FIGURE 3*f* will be recognized as the relative luminosity over the visible spectrum for a standard visual observer. In the ASA system, a sensor having these characteristics is called $\bar{y}$.

The ASA $\bar{x}$ sensor has two points of maximum sensitivity, one in the blue region and one in the amber region. It is impractical to attempt the design of a single color filter which will adequately reproduce this complex transmission characteristic. Consequently, the composite curve 3*d* is modified by a color separation filter of characteristic 3*g* to produce curve 3*h*, which forms the amber sensitive portion of the $\bar{x}$ sensor between 505 and 780 millimicrons. In a similar fashion, the composite curve 3*d* is modified by a filter which has a transmission characteristic 3*i* to produce a blue sensor 3*j*, which covers the visible region for wave lengths shorter than 505 millimicrons. When suitably combined, curves 3*h* and 3*j* correspond to the $\bar{x}$ sensor of the ASA colorimetry system.

In a similar fashion, a filter with a transmission characteristic 3*k* modifies the composite curve 3*d* to produce a sensor whose sensitivity characteristic is curve 3*m*. This corresponds to the $\bar{z}$ sensor of the ASA system.

The four color separation filters may be located in FIGURE 2 as 8*a*, 8*b*, 8*c*, and 8*d*. Two filters, similar in transmission to FIGURE 3*e*, though with less critically controlled components, are employed at 14*a* and 14*b* in FIGURE 2 to modify the spectral response to the reference photocells to match the $\bar{y}$ characteristic of the ASA System.

FIGURE 4 depicts, in schematic form, the optical components, photoelectric transducers, and associated components which, with their interconnections, comprise the Sensor 1. As in FIGURE 2, lamps 9*a* and 9*b*, through infrared absorbing filters 10*a* and 10*b*, illuminate the sample 5. The sample surface 4 is thereafter viewed by four optical systems consisting of the lenses 3*a*, 3*b*, 3*c*, and 3*d*, and the corresponding color separation filters 8*a*, 8*b*, 8*c*, and 8*d*. This combination causes the photocells 6*a*, 6*b*, 6*c*, and 6*d*, respectively, to be illuminated by only the specific components of energy reflected by the sample surface 4 which will pass through the respective color separation filters. A resistor 24*a*, adjustable for purposes of initial calibration, provides a load for the current generated by the photocell 6*a*. The voltage which appears across this load resistor 24*a* is a function of the reflected spectral energy distribution of the sample surface 4 as modified by the various optical components. By proper design this voltage is an electrical analog of ASA $\bar{y}$ component.

In a similar fashion, the voltage appearing across the load resistor 24*b* is an analog of the $\bar{z}$ ASA component. The voltage appearing across load resistor 24*c* is an analog of the ASA $\bar{x}$ component for wave lengths longer than 505 millimicrons and the voltage appearing across resistor 24*d* is an analog of the $\bar{x}$ ASA component for those wave lengths shorter than 505 millimicrons. The resistor 23 in conjunction with resistor 24*d* serves to reduce the terminal voltage of the photocell 6*d* to conform with the system requirements. The voltages appearing across load resistors 24*c* and 24*d* are electrically added to produce the total $\bar{x}$ component.

Electrical analogs of each of the component energies reaching the three separate ASA sensors are thereby produced. These electrical analog voltages are series connected and, without further modification, conveyed by means of the conductors 26*a*, 26*b*, 26*c*, and 26*d* to the console for chromaticity computation. The conductor 26*a* provides an isolated ground return for all signals. The conductor 26*b*, with reference to ground, is the $\bar{y}$ electrical analog voltage. The conductor 26*c*, with respect to ground, is the total of $\bar{y}$ and $\bar{z}$ electrical analog voltages. The conductor 26*d*, with respect to ground, is a total of $\bar{x}$, $\bar{y}$, and $\bar{z}$ electrical analog voltages and is henceforth called Σ.

As previously mentioned, samples of the illumination from the lamps 9*a* and 9*b* enter the sampling rods 11*a* and 11*b* at the points 12*a* and 12*b* respectively. These illumination samples emerge from the sample rods at ends 13*a* and 13*b* and through modifying filters 14*a* and 14*b* impinge, respectively, upon the sensitive surfaces of two photocells 15*a* and 15*b*. Voltages appear in the load resistors 25*a* and 25*b* which are an electrical analog of the illumination reaching the sample surface 4 of the sample 5. The illumination electrical analog voltages are series connected and conducted by means of conductors 27*a* and 27*b* to a reference photocell amplifier 28 which will be described later.

The amplifier 28 modifies the illumination electrical analog voltage and provides isolation and power gain to permit subsequent computation. The amplified reference voltage, by means of the conductors 29*a* and 29*b*, is conducted to the console and used as a component of the reflectance computation. Regulated power, derived from the console, enters the Sensor through leads 30*a* and 30*b* and is thence conducted to the circulating fan 31, the lamps 9*a* and 9*b* and the reference photocell amplifier 28.

FIGURE 5 shows the reference photocell amplifier in greater electrical detail. The illumination electrical analog voltages enter the amplifier 28 through the conductors 27*a* and 27*b*. The capacitor 32 serves to filter the fluctuations in voltage which appear at this point due to flicker of the lamps 9*a* and 9*b*. A D.C. voltage derived from the output of the amplifier 28 is caused to appear across the feedback resistor 43*d* and is in turn subtracted from the electrical analog voltage appearing across the capacitor 32 to reduce the magnitude of the voltage which appears on the conductor 27*a*. Under normal operating conditions the voltage on conductor 27*a* with respect to ground is slightly negative.

A common type of electro-mechanical switch or chopper 33 alternately grounds and removes the ground from the chopper contact 33*a* and 33*b* in phase opposition. A low voltage square wave similar to that shown in FIGURE 5*a* appears on the chopper contact 33*a*. This square wave is negative with respect to ground when the chopper contact 33*a* is ungrounded and has zero voltage with respect to ground when the chopper contact 33*a* is grounded. A network, generally indicated at 34, serves to remove the D.C. voltage level and provides a signal on the conductor 35 which is electrically balanced with respect to ground. A resistor 34*a* serves to limit chopper contact current.

A conventional A.C.-coupled three stage amplifier 36, with an open loop gain of approximately 50,000 amplifies the square wave, and by means of a transformer 37, reverses its phase. The coupling network 38 applies the amplified voltage to the chopper contact 33*b* which is operating in phase opposition to the chopper contact 33*a*. As a result of the three-stage A.C.-amplifier and the phase reversal of the transformer 37, a square wave appears on the conductor 39 which is positive with respect to ground when the contact 33*b* is ungrounded and has zero voltage with respect to ground when the contact 33*b* is grounded.

The average level of this voltage is positive and the integrating network 40 serves to average and filter this voltage before impressing it upon the grid 41*a* of the vacuum tube 41.

The vacuum tube 41 is used as a cathode follower with its plate supply voltage coming from the usual type filtered D.C.-power supply. The cathode 41*b* is connected to means of a load resistor 42 to ground, and the polarity of the voltage which appears at this cathode is the same as that which appears at the grid 41*a*. Therefore, the voltage on cathode 41*b* will be positive with respect to ground.

By means of an inverse feedback network comprised of an adjustable resistor 43*a*, a fixed resistor 43*b*, a capacitor 43*c*, and a resistor 43*d*, a portion of the voltage on the cathode 41*b* is caused to appear across the feedback resistor 43*d*. As pointed out in the beginning of this description, this voltage opposes the illumination analog voltage which appears across the capacitor 32. A balanced condition is readily achieved and by appropriate choice of the values of the resistors 43*a*, 43*b*, and 43*d* the desired closed loop gain is achieved. The closed loop gain of the reference photocell amplifier may be, for example, 250. The function of the capacitor 43*c* is to prevent oscillation and enhance the stability of the overall system. The amplified electrical analog voltage, now called Reference voltage, is conducted by means of conductors 29*a* and 29*b* to the console where it becomes a portion of the reflectance computation.

FIGURE 6 is an electrical diagram of a chopper-stabilized D.C.-amplifier, in general indicated by the numeral 44, which is used for the purpose of amplying the electrical analog voltages from the photometric photocells to produce voltages of sufficient magnitude for subsequent reliable computation of chromaticity. In the amplifier 44, which will later be referred to as a Chroma amplifier, one of the three electrical analog voltages is impressed upon the input terminals 45*a* and 45*b*. This voltage might, for instance, be the $\bar{y}$ electrical analog, in which case the conductor 26*a* of FIGURE 4 would be connected to terminal 45*a* and conductor 26*b* of FIGURE 4 would be connected to terminal 45*b*.

A two-stage integrating network 46, comprised of resistors 46*a* and 46*c* and capacitors 46*b* and 46*d* effectively filters and reduces the ripple voltage present in the photocells due to the flicker of the incandescent lamps 9*a* and 9*b*.

A chopper 47, whose contactor 47*b*, alternately makes connection to fixed contacts 47*a* and 47*c* in exact synchronism with the A.C. power source, is used to compare the voltage on contact 47*a* with that on contact 47*c*. The voltage on contact 47*a* is derived from the voltage impressed on terminal 45*b*. The resistor 46*e* serves to limit the contact current.

The voltage on contact 47*c*, through a similar current limiting resistor 63*f*, utilizes the voltage drop across resistor 63*a* as its signal source. It will be later explained that this voltage is derived from the amplifier output. For the sake of discussion it may be assumed that the voltage across resistor 63*a* is, for the moment, fixed and positive with respect to ground. It may also be assumed that the electrical analog voltage applied to the input terminals 45*a* and 45*b* is of slightly greater magnitude than the voltage appearing across resistors 63*a* and is likewise positive with respect to ground.

As a result of the electro-mechanical chopper 47, the difference between the two contact voltages appears as a square wave (FIGURE 6*a*) at the contactor 47*b*. The capacitor 48*a* filters high frequency components which might be present at this point because of the contact chatter or bounce. A two-stage differentiating network comprised of the capacitors 48*b* and 48*d* and resistors 48*c* and 48*e* effectively removes the D.C. voltage component from this square wave and applies the resulting balanced square wave to the input terminal 49*a* of a conventional three-stage band-pass vacuum-tube amplifier 49.

After amplification, this square wave appears at the output terminal 49*b* of the amplifier, whereupon it is impressed on the grid 50*a* of the vacuum tube 50. The output signal derived from the plate 50*c* of this vacuum tube is coupled, by means of a transformer 53, to the plates of two diodes 56*a* and 56*b*. The network 54 and the inductance of the transformer 53 are broadly resonant to the amplifier band pass frequency. It will be noted that the voltages impressed upon the two diodes 56*a* and 56*b* are in phase opposition by the nature of the center tap on the secondary of transformer 53. A reference voltage derived from the normal A.C. power mains, through the transformer 55 impresses a phase reference voltage on the diodes 56*a* and 56*b* in parallel.

To those skilled in the art it will be seen that the action herein described is that of a phase detector and under the chosen set of circumstances it may be assumed that the rectified voltage which appears across the resistor 57*a* and the capacitor 58*a* is greater in magnitude than that which appears across the resistor 57*b* and the capacitor 58*b*. As a result of this condition and the opposing nature of these voltages, a positive voltage appears on the conductor 59. This voltage, by means of an integrating network comprised of a diode 60*a*, two resistors 60*b* and 60*c*, and a capacitor 60*d*, is impressed upon the grid 61*a* of the vacuum tube 61.

The vacuum tube 61 is connected as a cathode follower, utilizing the load resistor 62, to an external negative power supply. The voltage which appears on the cathode 61*b*, through a feedback network comprised of the resistors 63*a*, 63*b*, 63*c*, and 63*d* and the capacitor 63*e* is impressed upon the chopper contact 47*c* to complete the feedback loop. Proper choice of the three resistors 63*a*, 63*b*, and 63*c* will determine the portion of the cathode voltage on the output conductor 64 appearing at the contact 47*c* of the chopper. By means of an adjustment of the resistor 63*c* this proportion and thereby the feedback ratio of the overall amplifier may be controlled.

The resistor 63*d* and the capacitor 63*e* form a damping network which prevents oscillation and enhances the stability of the overall system. A desired feature of this amplifier is its rapid correction rate for voltages applied at the input terminals 45*a* and 45*b* which would cause the terminal 45*b* to become more positive than its previous value while maintaining a relatively slow rate of correction for those input voltages which would make the terminal 45*b* more negative than its previous value. This result is effectively accomplished by means of a compound integrating network generally indicated at 60.

It will be seen that voltages on the conductor 59, which are more positive than those on the grid 61*a* of the vacuum tube 61, will be conducted through the diode 60*a* and the resistor 60*c* in order to change the charge on the capacitor 60*d*. However, voltages on the conductor 59 which are more negative than the grid 61*a* are conducted through a higher resistance path comprised of the resistor 60*b* and resistor 60*c*, thereby slowing the rate of discharge of the capacitor 60*d*. This is an effective method of reducing the correction time between separate individual samples if this overall apparatus is used on a rapid production basis.

An additional design feature of this amplifier is that zero output voltage must appear at the cathode 61*b* of the cathode follower and consequently on the output conductor 64 when the input conductor 45*b* is at zero potential with respect to the input ground conductor 45*a*. This end is accomplished by introducing a small A.C. voltage through the resistors 52*a*, 52*b*, and 51 into the cathode 50*b* of the final amplifier stage. This A.C. voltage, once amplified, detected, and integrated, results in a negative voltage appearing at the grid 61*a* of the output cathode follower which exactly compensates for the offset bias which might otherwise be encountered. The variable resistor 52*a* permits adjustment of the value of this A.C. voltage in order to compensate for variations in individual components.

An additional design feature enhances stability with line voltage variation. In amplifiers of this general type, variations in filament temperature of the first stage of the amplifier normally result in a changing electron current flowing between a cathode and grid of such first stage. It is the additional function of the differentiating network 48*b*, 48*c*, 48*d*, and 48*e* in conjunction with the current limiting resistors 46*e* and 63*f* to reduce random drift because of filament temperature change. The high degree of stability and linearity required for successful chromaticity computation is achieved in this amplifier through its high ratio of open loop to closed loop gain. The open loop gain of the amplifier 44 is approximately 250,000, while its closed loop gain may be reduced, by means of inverse feedback, for example, to 500. Acceptable linearity is thereby achieved.

FIGURE 7 depicts the method of chromaticity and reflectance computation utilizing the previously described Sensor 1 and three Chroma amplifiers 44*a*, 44*b*, 44*c*. In the foregoing discussion it was determined that the $\bar{y}$ chromaticity component was present as an electrical analog on the conductor 26*b* with respect to ground 26*a*. This electrical analog voltage is amplified by the Chroma amplifier 44*a* and appears on the output conductor 64*a* of this amplifier as the Y voltage. In similar fashion the sum of $\bar{y}$ plus $\bar{z}$, which appears on conductor 26*c*, is amplified by Chroma amplifier 44*b* and appears on its output conductor 64*b* as the voltage $Y+Z$, and $\bar{\Sigma}$ electrical analog voltage which appears on conductor 26*d* is amplified by Chroma amplifier 44*c* and appears on its output conductor 64*c* as the voltage $\Sigma$.

The electrical illumination analog voltage derived from the reference photocell amplifier 28 is conducted from the Sensor along the conductors 29*a* and 29*b*, and is applied across the outermost terminals of a computing potentiometer 65. The positive reference voltage conductor 29*b* being applied to the clockwise terminal of the computing potentiometer 65 and the negative reference voltage conductor 29*a* being applied to the counterclockwise terminal. An adjustable contact 65*a* on the potentiometer 65 may therefore be adjusted to produce any portion of the total reference voltage with respect to its own negative terminal 29*a*.

The sensor photocell ground conductor 26*a* is the signal ground for the three Chroma amplifiers and the three computing potentiometers. The negative reference voltage conductor 29*a* is electrically connected to the signal ground 26*a* at the computing potentiometers.

In the foregoing description it was determined that the $\bar{y}$ electrical analog voltage was, in actually, a measurement of the total energy received by a sensor having the spectral response characteristics corresponding to the visibility curve of a human eye. Therefore a direct measurement of the Y voltage on the conductor 64*a* might be compared with the illumination analog voltage impressed across the potentiometer 65 to determine the absolute reflectance of the sample being examined by the sensor 1. Increasing proportional rotation of the potentiometer wiper 65*a* increases the portion of the reference voltage which appears on this wiping contact. When the voltage difference between the conductors 64*a* and 65*a*, referred to in FIGURE 7 as $\Delta R$, is reduced to zero by adjustment of the potentiometer 65, the proportional rotation of the potentiometer 65 may be equated to the absolute reflectance of the sample being analyzed. A suitable dial marked from 0.000 to 1.000, increasing in a clockwise direction, may therefore be directly calibrated in terms of absolute reflectance of the sample.

In accordance with the American Standard Methods for Measuring and Specifying Color, chromaticity is described in terms of a "Value of $x$" equal to $$\frac{X}{\Sigma}$$

and a "Value of $y$" equal to $$\frac{Y}{\Sigma}$$

Electrical analogs of the tristimulus components are available on the output conductors 64*a*, 64*b*, and 64*c* of the three Chroma amplifiers 44*a*, 44*b*, and 44*c*. It will be recalled that the voltage difference between conductors 64*b* and 64*c* is in reality an analog of X, since $\Sigma=X+Y+Z$ and $\Sigma-(Y+Z)=X$.

The voltage, $\Sigma$, on conductor 64*c* is impressed on the counterclockwise terminal of a computing potentiometer 66 and the clockwise terminal of the computing potentiometer 67. The clockwise terminal of potentiometer 66 and the counterclockwise terminal of potentiometer 67 are returned to the signal ground conductor 26*a*.

If the movable contact 66*a* of the potentiometer 66 is adjusted to reduce the voltage difference between conductors 66*a* and 64*b* to zero, $\Delta X$, can then be said to be zero. The proportional rotational of the potentiometer moving contact 66*a* from its counter clockwise terminal therefore yields a voltage at 66*a* which is a function of this proportional rotation and the total voltage $\Sigma$. A dial attached to the movable contact 66*a* of a potentiometer 66 may then be directly calibrated in "Value of $x$."

In a similar fashion, the comparison of the Y voltage with the proportional rotation of the potentiometer 67 required to produce a zero voltage difference between its wiper 67*a* and the output conductor 64*a* will yield the "Value of $y$" in the terms of proportional rotation of the potentiometer wiper 67*a* from its counterclockwise mechanical stop. The simple mathematical steps by which chromaticity and reflectance are computed are shown in more rigorous form at the bottom of FIGURE 7.

The chromaticity values thereby automatically computed, by adjusting the computer potentiometer 66 and 67 to produce a zero $\Delta Y$ and $\Delta X$, may be plotted on or otherwise compared with the American Standard Chromaticity Diagram FIGURE 8. Further reference to FIGURE 8 during subsequent descriptions will permit better understanding of the component functions and computation methods used in this invention.

A suitable error-detecting device which will indicate the minimum value of ΔX, ΔY and ΔR will enable the foregoing components to be used as a direct reading colorimeter. Speed of operation of such a colorimeter is greatly enhanced by the direct reading nature of the computing potentiometers 66, 67, and 65 which respectively read directly in "Value of *x*," "Value of *y*" and Reflectance.

In a similar fashion, a null-seeking servo system may be used to drive the computer potentiometers until a minimum value of ΔX, ΔY and ΔR is reached.

An automatic, servo-balanced, direct reading colorimeter would be a further obvious modification utilizing all of the basic components and techniques previously described herein.

Automatic color sorting can be accomplished if a polarity and amplitude sensitive detecting device is used to measure the polarity and magnitude of ΔX, ΔY and ΔR, thereby comparing the chomaticity and reflectance of an unknown sample with the values previously set on the computing potentiometers 65, 66, and 67. One such polarity and amplitude sensitive detector further enhanced through the inclusion of certain information storage features is shown in FIGURE 9. This component is indicated generally as 68 and will subsequently be called a Sorter. It is comprised of 3 major subsections; 68*a*, the error amplifier; 68*b*, a gated amplitude-and-phase sensitive detector; and 68*c*, the storage elements.

For the sake of discussion, it is herein assumed that the particular Sorter being described is connected in the overall configuration to detect variations in ΔR. With this premise, the wiper of the potentiometer 65*a* (FIGURE 7) is connected to the input terminal 69*a* of the error amplifier 68*a*, and the Y voltage on conductor 64*a* is connected to the opposing input terminal 60*b* of the error amplifier 68*a*. An input low pass filter designated as 70 comprised of resistors 70*a*, 70*b*, 70*f*, and 70*g* and capacitors 70*c*, 70*d*, and 70*e* applies these input voltages to the two fixed contacts 71*a* and 71*b* of the electromechanical chopper 71. The choice of the components in the input filter 70 is such that a relatively short time constant is used from each of the input terminals 69*a* and 69*b* to signal ground. The integrating network used in conjunction with the input terminal 69*a* is composed of the resistor 70*b* and the capacitor 70*d*. The input integrating network following terminal 69*b* is composed of the resistor 70*a* and the capacitor 70*c*. A relatively long time constant network composed of the resistors 70*a*, 70*b* and the capacitor 70*e* enhances the stability of the overall system by suppressing high frequency variations which may be present at the input terminals 69*a* and 69*b* with respect to each other while permitting rapid transients to appear between each of the input terminals 69*a* and 69*b* with respect to signal ground. The resistors 70*f* and 70*g* serve to limit contact current in the chopper 71.

As the contactor 71*c* of the chopper 71 alternately makes connection to the fixed contacts 71*a* and 71*b*, a low voltage square wave, FIGURE 9*a*, appears on the contactor 71*c*. It can be realized that the amplitude of this square wave is a function of the voltage difference between the two input terminals 69*a* and 69*b* while its phase is a function of the relative polarity of the input voltage difference. An input network 72 composed of capacitors 72*a* and 72*b* and the resistor 72*c* serves to couple the grid 73*a* of the vacuum tube 73 to the chopper contactor 71*c*. The capacitor 72*a* serves to reduce the effect of chopper contact bounce while the combined effect of the capacitor 72*b* and the resistor 72*c* is to de-couple the D.C. component of input voltage and permit only the square wave which represents actual voltage difference between the two input terminals to appear at the grid 73*a* of the vacuum tube 73.

The amplified error voltage appears across the plate load resistor 74*a* and is coupled to the grid 75*a* of the vacuum tube 75 by means of the capacitor 74*b* and the resistor 74*c*. Conventional fixed negative bias and positive supply voltages are used throughout. The error voltage, amplified by the vacuum tube 75, appears across the load resistor 76. An inverse feedback loop, used to provide stability as well as stepwise variations in sensitivity, couples a portion of the error voltage appearing at the plate 75*b* of the vacuum tube 75 to the grid 77*a* of the vacuum tube 77. This inverse feedback network is composed of a capacitor 78*a* which serves as a coupling capacitor and a stepwise variable voltage divider consisting of the resistor 78*b* and four switchable fixed resistors 79*a*, 79*b*, 79*c*, and 79*d*. By selection among the four resistors 79*a*, 79*b*, 79*c*, or 79*d*, a variable portion of the twice amplified error voltage appearing at the plate 75*b* of vacuum tube 75 may be applied to the grid 77*a* of the vacuum tube 77.

The vacuum tube 77 is connected as a cathode follower and in turn shares a common load resistor 80*a* with a cathode 73*b* of the vacuum tube 73. The current which flows through the vacuum tube 77 passes through the two resistors 80*a* and 80*b* while the current flowing through the vacuum tube 73 flows only through the resistor 80*a*. Choice of circuit components is such that the current through the vacuum tube 77 is predominant and, as a result, variations in this current, produced by the voltage impressed upon the grid 77*a* of the vacuum tube 77, cause a corresponding variation in the current and therefore voltage gain of the vacuum tube 73. Choice of phase is such that inverse feedback is thereby accomplished and four discrete steps of overall gain from the grid 73*a* to the plate 75*b* are thereby provided.

The amplified voltage appearing at plate 75*b* is coupled by means of a capacitor 81*a* and the resistor 81*b* to the grid 82*a* of the vacuum tube 82. The cathode 82*b* of this vacuum tube returns to ground through a series of four switchable cathode resistors 83*a*, 83*b*, 83*c*, and 83*d*. The voltage which appears on the grid 82*a* influences the cathode current of the vacuum tube 82 and since this cathode current is not bypassed, negative feedback, caused by the voltage drop in the cathode resistor 83*a*, 83*b*, 83*c*, or 83*d* causes the voltage which appears between the cathode 82*b* and the grid 82*a* to be less than that which appears between grid 82*a* and ground. A corresponding current flows in the plate load resistor 84 of the vacuum tube 82 and, by virtue of the variable inverse feedback provided by the switchable cathode resistors, the relative gain between the grid 82*a* and the plate 82*c* can be controlled in discrete steps.

In practice, the switchable resistors 79*a*, 79*b*, 79*c* and 79*d* provide coarse sensitivity steps while the resistors 83*a*, 83*b*, 83*c* and 83*d* provide finer steps of sensitivity. A preferred choice of components could yield 16 discrete sensitivity steps utilizing various combinations of one switched resistor in each of these two feedback networks. The amplified and gain controlled error voltage appearing on the conductor 85 is applied by means of a coupling capacitor 86*a* and a grid resistor 86*b* to the grid 87*a* of the vacuum tube 87.

The vacuum tube 87 and its associated circuitry make up the phase and amplitude sensitive error detector 68*b*. Capacitor 86*a* and resistor 86*b* are so chosen that a partially differentiated square wave, similar in appearance to FIGURE 9*b*, appears at the grid 87*a* of the vacuum tube 87. A large negative bias voltage is maintained by means of an external bias supply so that plate current in vacuum tube 87 can only flow when the positive peaks of this differentiated square wave drive the grid 87*a* of the vacuum tube 87 to a voltage more positive than its cutoff bias level. A second grid 87*b* of the vacuum tube 87 is connected to a pulse producing circuit which maintains this grid at a positive negative value at all times except during the decision gate interval. The decision gate interval is defined as that time interval, determined by external control equipment, when conditions are such as to permit an accurate determination of the amplitude and polarity of the error signal unemcumbered by deleterious effects of motion of the sample and circuit transients.

During the decision gate interval, the grid 87*b* is pulsed positive, similar to the wave form FIGURE 9*c*, and this grid then functions as an accelerator or screen grid and imparts an increased velocity and directional characteristic to the groups of electrons which are permitted, by the nature of the bias and signal voltages, to pass through the grid 87*a* and to subsequent tube elements.

Two deflection electrodes 87*c* and 87*d* are likewise included within the vacuum tube 87. These serve to direct the controlled groups of electrons toward either the collecting plate 87*e*, or the collecting plate 87*f*. When the deflection electrode 87*c* is more positive than electrode 87*d* the groups of electrons which are permitted to flow because of the combined bias and signal on the grid 87*a*, and the acceleration voltage on the grid 87*b*, impinge upon the plate 87*e* and the total current flow in the tube thereby produces a negative voltage at the plate 87*e* with respect to the positive voltage supply. This voltage appears across the external load resistor 88. In the converse situation, where the deflection electrode 87*d* is positive with respect to electrode 87*c*, those electrons which flow due to the bias and signal conditions on the grid 87*a*, and the gate voltage on the grid 87*b*, impinge upon the plate 87*f* and cause a corresponding voltage drop in the plate load resistor 89*a*.

The deflection electrodes 87*c* and 87*d* are energized by an external source of square waves 224 applied in phase opposition to the conductors 99*a* and 99*b*. These square waves have the appearance of FIGURES 9*d* and 9*e* respectively, and, because of their exact time synchronism with the voltage driving the chopper 71, serve to permit the vacuum tube 87 to function as a polarity intelligent detector concerning the input voltage applied to the terminals 69*a* and 69*b*. Amplitude differentiation is provided by means of the cutoff bias applied to the grid 87*a* and signal amplitude derived from the error amplifier. A gating voltage of waveform FIGURE 9*c* permits the vacuum tube 87 to function only when all other external conditions are favorable. By this combination of components and control signals, a variable sensitivity, polarity and amplitude sensitive detecting device, and error amplifier can be made to function only during a prescribed time interval.

In the event that all the prescribed conditions have resulted in a negative pulse caused by a plate current flow to the plate 87*f*, of the vacuum tube 87, a negative voltage pulse will appear across the load resistor 89*a*. This negative voltage pulse is conducted by means of a network consisting of the resistors 89*b*, 89*c*, 89*d*, 89*e* and 89*f*, and the capacitor 89*g* to the grid 90*a* of a vacuum tube 90 which is maintained in a saturated condition by means of the operating characteristics of the vacuum tube 92. The negative pulse of voltage appearing at the grid 90*a* causes a corresponding decrease in the plate current of the tube 90. An ensuing positive pulse appears at the plate 90*b* and by means of the resistors 91*a* and 91*b* is coupled to the grid 92*a* of the vacuum tube 92. This results in a sharp increase in current in the tube 92 and reverses the bistable condition of the vacuum tubes 90 and 92; tube 92 becoming saturated and tube 90 cut off. By the nature of the coupling networks interconnecting these vacuum tubes, a stable condition, results which will be maintained as long as required. As a result, then, of a sufficient magnitude error occurring during the decision gate interval and of such polarity as would cause a plate current flow through the load resistor 89*a*; the bistable condition of the vacuum tubes 90 and 92 has been reversed.

In a similar fashion, it could be shown that the reversal of the polarity of the input error signal could result in reversal of the bistable condition of a similar pair of vacuum tubes 93 and 94. It can be therefore understood that small errors which do not produce appreciable plate current flow in the tube 87 will result in neither pair of bistable storage elements being affected. A positive polarity error signal of sufficient magnitude might be considered to cause a reversal of the bistable condition of the vacuum tubes 90 and 92; while a negative polarity error signal might cause a reversal of the bistable condition of the vacuum tubes 93 and 94. When the bistable condition of the vacuum tubes 90 and 92 is disturbed by a sufficient magnitude error signal, then the conductor 95*a*, because of the cutoff condition of the vacuum tube 90, is at a high positive potential with respect to ground. Correspondingly, the vacuum tube 93 is still saturated since it has been unaffected by the input error signal. The conductor 95*b* therefore has only a small positive voltage with respect to ground.

A network consisting of the resistors 96*a*, 96*b* and 96*c* impresses the sum of the voltages on the conductor 95*a*, 95*b*, and a negative bias supply on the grid 97*a* of another vacuum tube 97. If either conductor 95*a* or 95*b* has a high positive voltage with respect to ground, then the grid 97*a* and the vacuum tube 97 will be positive with respect to ground, and due to the saturation condition thus imposed upon the vacuum tube 97, the conductor 95*c* will be a low positive voltage with respect to ground. If neither conductor 95*a* nor conductor 95*b* is at a high positive voltage with respect to ground, then the voltage impressed upon the grid 97*a* of the vacuum tube 97 will be negative, and as a result of the cutoff condition of the vacuum tube 97, the voltage appearing on the conductor 95*c* will be a high positive voltage with respect to ground. Three stable conditions thereby result. Sortable positive errors produce a high positive voltage on the conductor 95*a* while conductors 95*b* and 95*c* remain at a low positive voltage with respect to ground. Sortable negative errors produce a high positive voltage on the conductor 95*b*, while conductors 95*a* and 95*c* remain at a low positive voltage with respect to ground. Error voltages of either polarity which are not of sufficient magnitude to be sorted result in a high positive voltage on the conductor 95*c* while conductors 95*a* and 95*b* are at low positive voltage with respect to ground.

A positive clearing pulse having the appearance of FIGURE 9*f* is applied to the conductor 98 and by means of the capacitor 89*h* to the vacuum tube grid 90*a*, thereby returning it to its normal saturated condition after completion of the sorting cycle. This pulse is likewise applied to the grid 93*a* of the vacuum tube 93 to return it to its saturated condition at the completion of the sorting cycle. By this means, at the completion of each sorting cycle both bistable storage elements may be reset to the zero error condition. Three sorters each similar to 68 are used for the detection of sortable errors in $\Delta X$, $\Delta Y$ and $\Delta R$.

By means of a Sort Selector switch 222 (FIGURE 1) whose function is shown in chart form in FIGURE 10, the two chromaticity variables, "Value of *x*" and "Value of *y*," and Reflectance may be assigned in all their combinations to the three sorters, thereby permitting various types of one, two and three dimensional sorting. As noted on the chart, one and two dimensional sorting involves certain sensitivity restrictions in order to ensure that one sorter functions with a smaller error signal than the second sorter which may be assigned to the same error signal.

In explanation of FIGURE 10, sort type 1 is a three-dimensional sort utilizing $\Delta X$, $\Delta Y$ and $\Delta R$. $\Delta X$ is assigned to a sorter which is called A; $\Delta Y$ is assigned to the B sorter; and $\Delta R$ is assigned to the C sorter. There are no special sensitivity requirements, and a reject source is so chosen as to cause the individual sample to be rejectable if its variation exceeds, for example, three times the normal sortable input for the A, B, or C sorters.

Sort type 2 is one of several two-dimensional sorts in which the A sorter is assigned to ΔX, the B sorter is likewise assigned to ΔX, and the C sorter is assigned to ΔY. To ensure that the A sorter functions on a smaller magnitude of ΔX than the B sorter, it is necessary that the A sorter sensitivity be set more sensitive than the B sorter. There is no restriction on the C sorter. The reject source for all two-dimensional sorts causes the reject circuit to function when the input error signal exceeds, for instance, ⅝ that signal which is applied to the B sorter, or three times that signal which is applied to the C sorter.

Sort type 8 is a typical example of a one-dimentional sort in which the A, B, and C sorters are all assigned to ΔX. In this configuration the A sorter must function on a smaller error than the B sorter which in turn must function on a smaller error than the C sorter. The reject source is such that the reject circuit functions, for example, on 7/5 of the input signal which would be required for the C sorter to function. While full flexibility of sensitivity adjustment is provided, logic demands that each sort group be of the same dimensions as adjacent sort groups. It is on this basis that the special sensitivity conditions and suggested reject levels have been established.

In accordance with the chart FIGURE 10, an error divider, gated reject detector and storage element circuit is shown in FIGURE 11. The amplified error voltage on the conductor 85 of each error amplifier 68*a* is appropriately divided in the following fashion: the error signal from the A sorter is coupled by means of capacitor 100*a* through a divider consisting of resistors 100*b* and 100*c*; a diode 101*a* couples the peak positive value of the voltage at the junction of resistors 100*b* and 100*c* to the switch contact 104*a*. In similar fashion, the amplified error voltage from the B sorter is coupled by means of a capacitor 100*d* and resistors 100*e*, 100*f*, and 100*g*, whereby the peak positive value of voltage appearing at the junction of resistors 100*f* and 100*g* is conducted by means of diode 101*b* to the common switch contact 104*a*. In similar fashion, the amplified error voltage from the C sorter is coupled by means of the capacitor 100*h* and the resistors 100*i*, 100*j*, and 100*k*. The peak positive value of voltage at the junctions of resistors 100*j* and 100*k* is coupled by means of a diode 101*c* to the switch contact 104*a*. The peak positive value of voltage appearing at the switch contact 104*a* will then be a preset portion of the maximum voltage appearing as an error from the A, B, or C sorters, as the case may be. Switch contact 104*a* is reject source 1 of the chart FIGURE 10.

In a similar fashion, diode 102*a* delivers the peak positive voltage at the junction of resistors 100*e* and 100*f* to the switch contact 104*b* and diode 102*b* delivers the peak positive value at the junction of resistors 100*j* and 100*k* to switch contact 104*b*. Switch contact 104*b* is reject source 2, and is used for all of the two-dimensional sorts.

The single dimensional sorts utilize switch contact 104*c* and diode 103 to couple the peak positive voltage at the junction of resistors 100*i* and 100*j* when this circuit configuration is desired. Depending on the reject source, the switch 104, through its wiping contact 104*d*, is connected to reject source 1, 2 or 3 through contacts 104*a*, 104*b*, or 104*c*, respectively. A short time constant integrating network comprised of resistor 105*a* and capacitor 105*b* serves as a coupling network between the reject source selector switch 104 and the grid 106*a* of a cathode follower vacuum tube 106. The voltage at the cathode 106*b* is a low impedance peak positive source of the error appearing at the selected reject source. The same decision gate voltage FIGURE 9*c* used in the decision elements 68*b* is again utilized to permit functioning of the reject detector vacuum tube 110 only during the decision gate interval. The voltage at the grid 110*a* of vacuum tube 110 is maintained at a value more negative than its cutoff bias by means of a bias network comprised of resistors 107*a*, 107*b*, 107*c*, 107*d* and 107*e*. During the decision gate interval the conductor 107*f* becomes highly positive with respect to ground.

The maximum positive excursion at the anode of the diode 109 is clamped by means of the voltage appearing at the wiping contact 108*a* of the potentiometer 108. This potentiometer provides a low impedance negative source to effectively limit the maximum positive excursion of the decision gate.

The coincidental occurrence of the decision gate and a large amplified error signal at any of the input conductors 85, as selected by the switch 104, will result in a voltage pulse appearing at the grid 110*a* of the vacuum tube 110. When the voltage at the grid 110*a* is sufficiently positive to cause plate current to flow in plate load resistor 111*a* then negative voltage pulses will appear at the plate 110*b* in the vacuum tube 110. In a manner essentially identical with the previous example of the storage elements 68*c*, of the sorter FIGURE 9, the vacuum tubes 112 and 113 serve as bistable storage elements. Components 111*a*–111*k* perform similar functions to their counterparts in the decision element 68*b* and storage element 68*c* of the sorter 68.

The conductor 114 becomes highly positive with respect to ground if a large amplified error signal appears on any appropriate input conductor 85 during the decision gate interval. In a fashion similar to the storage elements 68*c* of the sorter 68, a positive clearing pulse applied to the conductor 98 returns the bistable pair of vacuum tubes 112 and 113 to a condition where the output conductor 114 is only slightly positive with respect to ground. By the use of this reject divider, gated reject detector, and storage element, those error voltages, which are larger by a predetermined amount than the error voltage required to cause a sort to occur, may be used to categorize individual samples as rejectable.

It is the purpose of the Shade Matrix FIGURE 12 to partially digitalize the tertiary encoded chromaticity and reflectance decisions to produce useful shade decision information. The Shade Matrix 117 derives its input information from the A and B sorters. The input conductor 115*a* being connected to the Sorter output conductor 95*b* and therefore highly positive with respect to ground when the A negative storage element is activated. The input conductor 115*b*, connected to Sorter output 95*c*, is highly positive with respect to ground when neither the A negative nor A positive storage elements are actuated. The input conductor 115*c*, connected to Sorter output 95*a*, is highly positive with respect to ground when the A positive storage element is activated. In all cases only one of the three input conductors 115*a*, 115*b* or 115*c*, is highly positive with respect to ground at any one time, the other two being at or near zero potential.

In a similar fashion the input conductors 116*a*, 116*b* and 116*c* are connected to the B sorter output conductors 95*b*, 95*c* and 95*a* respectively. It is the nature of the Shade Matrix 117 to combine these voltages, which are in a tertiary encoded form, in order to produce a digital output having 9 unique conditions for the 9 unique combinations of A or B sorter outputs. It is the nature of an adder networks 117*a*–117*i* to so combine the A and B sorter output voltages as to produce these 9 individual output conditions. In FIGURE 12*a*, a typical adder 117*a* is chosen for discussion. The voltages from A and B storage elements may be applied to the input conductors 118*a* and 118*b*. In this case input conductor 118*a* would be connected to the A sorter negative output conductor 115*a* and input conductor 118*b* would be connected to the B sorter negative output conductor 116*a*. The conductor 119 is connected to a conventional negative supply.

The voltage difference between the input conductor 118*a* and the negative conductor 119 is divided by the resistors 120*a* and 120*b*. It can thereby be realized that a choice of these components could be made which would yield a negative voltage at the junction of resistors 120*a* and 120*b* when the voltage applied to the input conductor 118*a* was near zero in potential. The same choice of resistors 120*a* and 120*b* could likewise yield a positive voltage at their junction for a highly positive voltage applied to the input conductor 118*a*. A similar set of circumstances permits a negative or positive voltage to appear at the junction of the dividing resistors 120*c* and 120*d* depending on the voltage applied to the input conductor 118*b*. By the nature of the two resistors 120*e* and 120*f* and the two diodes 120*g* and 120*h* the output conductor 121 will have the voltage which appears at the junjction of resistors 120*a* and 120*b* or resistors 120*c* and 120*d*, whichever is more negative with respect to the output conductor 121. It can therefore be seen that application of a near zero potential voltage to both input conductors 118*a* and 118*b* would result in a highly negative voltage appearing on the output conductor 121. For the condition where the input conductor 118*a* was near zero potential while the input conductor 118*b* was highly positive with respect to ground the output conductor 121 would still be maintained at a voltage which was negative with respect to ground. It is only with the coincidental application of highly positive voltages to both input conductors 118*a* and 118*b* that the output conductor 121 will be highly positive with respect to ground. Examination of the Shade Matrix 117, FIGURE 12, will show that this set of conditions can exist in only one adder circuit for any configuration of the A and B sorters. It is therefore possible to digitalize the tertiary encoded information, coming from the A and B sorters to produce a highly positive voltage on only one of the output conductors 121*a* through 121*i* at any one time. The various combinations of high positive voltages applied to the input terminals 115*a*, 115*b*, or 115*c* and 116*a*, 116*b*, or 116*c* therefore result in only one or the output conductors 121*a*–121*i* being positive.

The Shade Output Circuit FIGURE 13 combines the nine digitalized output signals from the Shade Matrix, appearing on conductors 121*a*–121*i* with the output of the C sorter 68 on conductors 95*a*, 95*b*, and 95*c*. The output conductor 95*b* is connected to the grid 122*a* of vacuum tube 122. This tube is used as a cathode follower to provide plate voltage for a series of nine vacuum tube and component networks 125–133 when the high positive output voltage condition on conductor 95*b* and the grid 122*a* indicate that a negative sort condition exists in the C sorter. In a similar fashion, the zero sort condition of the C sorter results in a high positive voltage being present on the output conductor 95*c* and on the grid 123*a* of the cathode follower vacuum tube 123. The vacuum tube 123 provides plate voltage for a series of vacuum tube and component networks 134–142. In similar fashion, the positive sort condition on the C sorter, in which the conductor 95*a* is highly positive with respect to ground, applies a high positive voltage to the grid 124*a* of the vacuum tube 124, and in turn supplies plate voltage through the cathode follower action of the vacuum tube 124 to a series of vaccum tube and component networks 143–151.

One of the vacuum tube and component networks is shown in FIGURE 13*a*. It is typical of component groups 125–151 and is used as a shade output cathode follower. The output signal of the Shade Matrix 117 appearing on conductor 121*a* is applied to the input terminal 125*c* of a shade output cathode follower 125. The resistor 125d serves to limit grid current, while the resistor 125*h* serves as the load resistor for the cathode follower vacuum tube 125*f*. Voltage for the plate 125*k*, of the vacuum tube 125*f*, is derived by means of the conductor 125*a* from the cathode follower 122. In the presence of a high positive voltage on the conductor 125*c* and the positive plate supply voltage on the conductor 125*a*, a positive voltage appears at the cathode 125*g* of the vacuum tube 125*f*. This potential, through a current limiting resistor 125*j*, causes a pilot light 125*i* to glow, indicating the simultaneous application of plate and grid voltages. It can be realized that this simultaneous grid and plate voltage application occurs only when the A and B sorter negative output voltages exist in the presence of a negative sort output from the C sorter.

The conductor 121*a* likewise applies a high positive potential to the input conductor 134*c* of the shade output network 134, and to the input conductor 143*c* of the shade output network 143. Since the grids 123*a* of vacuum tube 123 and 124*a* of vacuum tube 124 are connected to a near zero voltage source, no voltage is present at the cathodes 123*b* and 124*b*. Consequently, output signals do not appear on the output conductors 134*b* and 143*b* of the networks 134 and 143.

Plate voltage is applied to all of the plate voltage connections 125*a*–133*a*. However, network 125 is the only one which has coincidentally a high positive voltage to its input conductor 125*c*. As a result, output network 125 has a positive output voltage at its output conductor 125*b*, while the remaining 26 output networks 126–151 have essentially zero output voltage. The pilot bulb 125*i*, therefore, is the only one caused to glow.

FIGURE 13*b* is a chart which shows the various sorter configurations involved to produce 27 digitalized output signals from the tertiary encoded A, B and C sorter output signals. The 27 output signals now uniquely indicate each of the 27 shade possibilities.

The Shade-Sort Matrix and its associated components FIGURE 14 serves to recombine the digitalized shade information from the various shade output networks 125–151 to produce seven sort control signals and/or one reject control signal. These control signals are subsequently utilized to facilitate sorting of handling of the individually shaded samples. The Shade-Sort Matrix 152 has 27 individual input conductors, 125*b*–151*b* and 8 individual sort output conductors 152*a*–152*h*. FIGURE 14*a* shows a partial schematic of two of 27 identical switch and diode subassemblies which are part of the Shade-Sort Matrix 152. The output conductor 125*b* of the Shade output network 125 is connected by means of a reverse current eliminating diode 125*m* to an 8 position selector switch 125*n*. In a preferred arrangement, the selector switch 125*n* might be an eight position push button switch so arranged as to transfer the cathode connection of the diode 125*m* to any single output conductor 152*a* through 152*h*. A multiplicity of such switches, each deriving its input signal from an individual shade output cathode follower conductor 126*b* through 151*b* are connected in parallel with the original eight position switch 125*n*. In this fashion, any of the sort output leads 152*a* through 125*h* can be energized from any of the shade output conductors 125*b* through 151*b* by transferring the circuit by means of the switch 125*n* or its counterpart at the appropriate switch contact. For example, in FIGURE 14*a* conductor 125*b* through diode 125*m* and switch 125*n*, is connected to conductor 152*b*; and correspondingly, conductor 126*b* is connected to conductor 152*d*. Each of these output conductors is connected in series with a pilot light 154*a* through 154*h* and conductors 155*a* through 155*h* to subsequent components. It can thus be demonstrated that the tertiary encoded information resulting from the shade decision stored in the three sorters 68 may be converted to digital information in the form of an output signal on the conductors 125*b* through 151*b*, and further recombined by means of the Shade-Sort Matrix 152 to cause current to flow in any one of eight pilot bulbs 152*a* through 152*h*, thereby providing a visual indication of this overall action. The conductors 155*a*–155*h* are connected to the classifier FIGURE 15 or FIGURE 16.

The output conductor 152*h* is connected by means of a network consisting of a pilot lamp 153*a*, two resistors 153*b* and 153*c*, and a reverse current eliminating diode 153*d* to the conductor 114 and thereby to the plate 112*b* of the vacuum tube 112 which will be recalled as the output voltage source of the reject detector storage element. By this combination, current may be caused to flow through the pilot bulb 154*h* either from the reject detector storage element 112 or from any selected portion of the switch bank 125*n*–151*n* in the Shade Sort Matrix 152. By this means, the pilot light 154*h* can be used to signify, by means of the reject detector FIGURE 11, the measurement of a sample whose chromaticity or reflectance differs widely from the preset nominal values; or by means of the conductor 152*h* and the switch bank 125*n*–151*n*, a sample, the characteristics of which make it unacceptable for grouping as a portion of one of the other seven sort groups. The output information available on the conductors 155*a* through 155*g* may then be considered to represent usable recombined shades, suitably grouped to facilitate subsequent mechanical sorting. The output signal appearing on conductor 155*h* will be present whenever a sample whose shade differs widely from preset nominal values, or which is not capable of acceptable recombination with other shades, appears during a production run.

It is the function of the power type classifier FIGURE 15 to further modify the sort control signals obtained as the output of the Shade-Sort Matrix on conductors 155*a* through 155*h* for subsequent direct utilization by conveying or sorting equipment. The power type classifier 163 receives a sort control signal on its input conductors 155*a* through 155*g* and a reject control signal on 155*h*. A sort gate control signal derived from an external source FIGURE 17 enters the classifier on conductor 163*k* and serves to control the duration of the sort output power signal appearing on conductors 163*a* through 163*g*.

A sort cancellation signal on conductor 113*c* from the plate 113*b* of the reject storage tube 113 enters the Classifier 163 on the conductor 163*j* where it serves to cancel any of the input sort control signals appearing on the conductors 155*a* through 155*g*, in the presence of a reject signal. The input conductor 155*h* when energized during the sort gate interval produces a reject output power signal on the conductor 163*h*. A dispose gate voltage, derived from an external source FIGURE 17, enters the Classifier 163 on the conductor 163*i* and produces a dispose output power signal on the conductor 163*m* for the duration of the dispose gate. This dispose gate functions in conveying and handling equipment to mechanically release the sample prior to entry of a new sample into the viewing area. The Classifier 163 is used to directly control the functioning of mechanical sorting and conveying equipment. It therefore may be equipped with eight power thyratron tubes and associated components which in combination are referred to as 177*a*–177*h*. A typical thyratron circuit suitable for use in this type of power Classifier is shown as 177*a*.

The sort control signal enters on conductor 155*a* and produces a positive voltage drop across the resistor 156*a*. A network composed of the resistor 156*a*, 157*a*, 158*a*, and 159*a* in conjunction with a gating voltage on the conductor 170 subsequently described causes the grid of the thyratron 160*a* to become positive when a sort control signal is present on the conductor 155*a* simultaneous with the gating voltage on conductor 170. When this occurs the thyratron 160*a* produces rectified current in the network consisting of the resistor 161*a* and capacitor 162*a* from the commercial power mains applied on conductor 164. As a result of this rectifying action a powerful D.C. voltage appears between conductors 164 and 163*a*, 163*a* being more negative than 164. This voltage remains for the duration of the gating pulse on the conductor 170. The conductors 163*a* and 164 may be connected to a suitable external actuated component such as a solenoid, for example. Seven similar circuits are provided, each under the influence of the gating voltage on conductor 170 and deriving their individual sort control signals from the conductors 155*a* through 155*g* respectively; their individual rectified output power signals appear between conductor 164, which is common to all circuits, and the individual conductors 163*a* through 163*g*.

The externally derived sort gate signal appears on conductor 163*k* and by virtue of a resistive divider consisting of resistors 165*a* and 165*b*, and an external negative supply causes a modified control signal to appear on the grid 166*a* of the vacuum tube 166. This tube is connected as a cathode follower. When the conductor 163*k* is positive, due to the sort gate signal, the grid 166*a* of vacuum tube 166 is highly positive with respect to ground. As a result, the cathode 166*b*, through its load resistor 167, likewise becomes highly positive. The diode 169*b* ceases to conduct when the cathode 166*b* becomes more positive than ground. As a result, the maximum voltage which can appear on conductor 170 is approximately zero volts. Under these circumstances, simultaneous application of a sort control signal to any one of the conductors 155*a*–155*g* will cause one of the respective thyratrons 160*a*–160*g* to conduct. In the absence of a sort gate signal, the grid 166*a* of the vacuum tube 166 is highly negative with respect to ground, and through a resistive divider, consisting of resistors 167 and 171 and the diode 169*b*, the conductor 170 becomes highly negative with respect to ground, thereby effectively preventing any of the thyratrons 160*a*–160*g* from conducting.

In a similar fashion, because of the voltage at the cathode 166*b* and by means of the diode 169*a* and the resistors 167 and 168, a reject bias signal appears on the conductor 176. This is used in a fashion similar to the signal appearing on the conductor 170, to permit or prevent the operation of a similar thyratron 160*h* which derives its control information from the reject control signal input conductor 155*h*.

When the sample being analyzed is rejectable for reasons previously discussed, a negative sort cancellation signal appears on the conductor 163*j* from tube 113 FIGURE 11. By virtue of the resistive divider 172*a* and 172*b*, the grid 173*a* of the tube 173 becomes highly negative with respect to ground. The cathode 173*b* is thereby likewise highly negative with respect to ground and the diode 175 conducts to produce a negative voltage on the conductor 170 by virtue of the resistive divider action of the resistors 171 and 174. By this means a sort cancellation signal on conductor 163*j*, derived from the plate 113*b* of the vacuum tube 113, may be used to prevent the operation of any of the sort power output circuits 177*a*–177*g* in the presence of a rejectable sample.

The power type classifier 163 then serves to control the electrical energy subsequently utilized by external conveying equipment to implement separation of the various samples into the desired sort groups.

Other types of conveying equipment, which require a delay period between the sort decision and the actual mechanical grouping of samples into sort groups, require a signal type classifier, FIGURE 16, to actuate some external storage or memory device. In the signal type classifier 179, many of the functions of component groups are similar to those in the power type classifier FIGURE 15.

By virtue of the duplication of the components 165*a*, 165*b*, 166, 166*a*, 166*b*, 167, 168, 169*a*, 169*b*, 171, 172*a*, 172*b*, 173, 173*a*, 173*b*, 174 and 175, in the power type classifier 163 by respective similar components 194*a*, 194*b*, 195, 195*a*, 195*b*, 196, 197, 198*a*, 198*b*, 200, 201*a*, 201*b*, 202, 202*a*, 202*b*, 203 and 204 in the signal type classifier 179, the sort gate, reject gate and sort cancel voltages may be considered duplicated from the power type classifier 163 to the signal type classifier 179. The sort bias on conductor 170 of FIGURE 15 corresponds to the sort bias on conductor 199 of FIGURE 16, and likewise the reject bias on conductor 176 corresponds to the reject bias on conductor 205.

The function of the power output elements 177*a*–177*h* is similar to that of the signal output elements 206a–206h in that both modify a sort or reject control signal to produce the desired output during the sort gate interval. A typical signal output element 206a derives its sort control signal by means of conductor 155a, from the Shade-Sort Matrix FIGURE 14. The coincidence of a sort control signal on conductor 155a and a zero sort bias on conductor 199, by virtue of the resistance divider action of the resistors 180a, 181a, 182a and 183a causes the vacuum tube 184a to conduct to saturation, resulting, thereby, in a large voltage drop in the plate resistor 185a and a low positive voltage at the junction of resistors 185a and 186a. As a result of the resistive divider action of the resistors 186a and 187a, a high negative bias on the grid of the tube 188a effectively cuts off the plate current in this tube. By virtue of the non-conducting diode 191a and the resistive divider action of the resistors 189a, 190a, and 192a, a high positive sort output signal results on the conductor 193a for the duration of the sort gate signal on conductor 193k.

If either the predescribed high positive sort control signal on conductor 155a or the zero sort bias on conductor 199 is not present, then the vacuum tube 184a will be cut off and vacuum tube 188a will be saturated. A low positive voltage therefore appears at the junction of resistors 189a and 190a. By virtue of the resistive divider action of resistors 190a and 192a and the conducting condition of the diode 191a, the output conductor 193a is maintained at zero potential with respect to ground.

A similar action takes place in each of the sort signal output elements 206a–206g; the sort control signals on conductors 155a–155g resulting in a sort signal output on the respective conductors 193a–193g during the sort gate interval.

A reject signal output on conductor 193h results from a reject control signal on the conductor 155h for the duration of the sort gate interval. The sort cancel signal which appears on conductor 193j in the presence of a rejectable sample effectively cancels the sort gate and results in a negative bias on conductor 199, thereby preventing any sort signal output from appearing on any output conductor 193a–193g in which a rejectable sample is present.

A positive holding control signal applied to conductor 193i causes the tube 207c to be saturated and through an action similar to the function of the signal output element 206a, previously described, causes a high positive hold signal output to appear on conductor 193m. This signal voltage may be used by subsequent conveying equipment to cause a clamping, or holding, of the sample being evaluated. Removal of the hold control signal from the conductor 193i results in a reversal of the saturation of the tube 207c to a cut off condition. Vacuum tube 207g therefore saturates, and a zero output results on conductor 193m.

The signal type classifier 179, FIGURE 16 can therefore be shown to suitably modify the various control and gate signals to produce a series of sort signal outputs, a reject signal output and a holding or clamping signal output, each suitable for subsequent use in handling or conveying the samples during and subsequent to color shade evaluation.

Various external control signals have been previously referred to. These signals are derived from a control device, subsequently called a Sequencer, of which FIGURE 17 is one type, suitable for operation of the power type classifier FIGURE 15.

In FIGURE 17 the classifier is composed of a series of monostable pairs of vacuum tubes 209, 210, 211, 212, 213 and 214 of which pair 209 is a typical example.

The tube 209i is normally saturated due to its grid return resistor 209c being connected to a positive power supply. As a result, its plate current causes a large voltage drop in the combined plate resistors 209e and 209f. The conductor 209k is therefore at a low positive voltage with respect to ground. By virtue of the resistive divider comprised of resistors 209g and 209h, vacuum tube 209j is maintained at cut off and the combined pair of vacuum tubes are stable. This stable condition is typical of each of the pairs 209–214 until externally disturbed.

A negative pulse may be applied to the conductor 208b with respect to the ground connection 208a to start the complete sorting sequence as the result of a new sample being positioned before the Sensor (FIGURE 2). This negative pulse is coupled, by means of the capacitor 208c and 209b and resistor 209a, to the grid of tube 209i. As a result of this negative pulse, tube 209i is instantaneously cut off, and as a result, tube 209j becomes saturated. For the instant, the charge on capacitor 209b, which was equivalent to the positive supply voltage, remains constant. The plate of tube 209j, however, is now at low positive voltage wtih respect to ground. The ungrounded electrode of the gas discharge tube 209d becomes more negative with respect to ground than the discharge voltage of the gas tube 209d. Tube 209d therefore conducts and rapidly changes the charge on the capacitor 209b, until the charge is such that the extinction voltage of the gas discharge tube 209d is reached. At this point the tube 209d no longer conducts and by means of the resistor 209c, the charge on capacitor 209b gradually changes. Vacuum tube 209i has remained completely cut off during this time, due to the high negative charge on its grid. As the capacitor 209b gradually charges, however, this grid approaches zero potential with respect to ground. Tube 209i begins to conduct and the decreasing voltage on the conductor 209k by virtue of the resistors 209g and 209h cuts off tube 209j. This action saturates tube 209i and the orginal stable condition of this pair of tubes is again present. The duration of the cycle is determined by the choice of the resistor 209c and the capacitor 209b. The gas tube 209d serves to minimize the effects of vacuum tube variation on the period of this monostable pair. The voltage on the conductor 209k might have the appearance of the waveform 209m in FIGURE 17a. The initiating negative pulse on conductor 208b is assumed to occur at the 0, 400 and 800 millisecond time intervals The waveform 209m produced by the monostable pair 209 is used as a delay to permit the photocells 6a, 6b, 6c, and 6d, FIGURE 4; the chroma amplifiers 44a, 44b and 44c, FIGURE 7; and sorters 68, FIGURE 9; to stabilize after the positioning of a sample before the sensor FIGURE 2.

At the end of this look interval, waveform 209m returns to near zero potential with respect to ground. The negative transient at the junction of resistors 209e, 209f and 210a causes the monostable pair 210 to operate in the same manner as previously described relative to the pair 209. Selection of the pulse determining components is such that a short pulse, having a waveform 210m of FIGURE 17a is produced on conductor 210k. This pulse is used to cause resetting of the Sorter storage element tubes 90, 92, 93 and 94, of the storage element 68c, of the sorter 68, FIGURE 9; conductor 210k of FIGURE 17 being connected to conductor 98, of FIGURE 9. It also causes reset of the reject storage tubes 112 and 113 in FIGURE 11, the conductor 210k FIGURE 17 being connected to conductor 98 of FIGURE 11.

In a similar fashion, the end of the pulse from the monostable pair 210 initiates the pulse from the pair 211, which has a waveform 211m, FIGURE 17a. This output appears on conductor 211k and when connected to the grid 87b of tube 87 FIGURE 9 and conductor 107f, FIGURE 11, is used as a decision gate voltage.

The end of the decide pulse, on conductor 211k FIGURE 17, initiates a sort gate signal waveform 214m FIGURE 17a and await delay, waveform 212m FIGURE 17a. The sort gate is used in the classifier FIGURE 16 or FIGURE 17 to cause either the power or signal output to occur for the appropriate sort control signal. Conductor 214k of FIGURE 17 is connected to conductor **163*k* FIGURE 15 or conductor 193*k*** FIGURE 16 as the case may be.

The wait delay is used to permit operation of the various mechanical sorting devices which will subsequently handle the sample before the sample is actually released.

The end of the wait delay, waveform **212*m*, initiates a disposed control signal, waveform 213*m***, FIGURE 17*a*, on conductor **213*k*. This control signal, applied to conductor 163*i* FIGURE 15 will cause a power dispose signal to occur on conductor 163*m***, thereby releasing the present sample and permitting a subsequent sample to be placed before the sensor FIGURE 2.

The entire control cycle from its initiation to completion for two complete cycles is shown in FIGURE 17*a*.

FIGURE 18 illustrates a second type of sequencer, suitable for use with the signal type classifier FIGURE 16. The sequencer shown in FIGURE 18 is made up of five monostable pairs of vacuum tubes 216, 217, 218, 219 and 220, and one bistable pair 221. In a manner similar to the previous discussion, a negative trigger applied to the conductor **215*b* with respect to the ground conductor 215*a*, initiates the monostable cycle in the first stage 216. This stage serves as a trigger for subsequent stages and produces, on conductor 216*k*, a waveform 216*m***, FIGURE 18*a*. The end of this trigger pulse initiates two actions; the monostable cycle of the vacuum tube pair 217 and the bistable reversal of the pair 221. The action of the stages 217–220 is similar to the previous discussion, and on their respect in output conductors **217*k*–220*k*, waveforms 217*m*–220*m***, FIGURE 18*a* are produced.

The action of the bistable stage 221 is initiated by the decrease in voltage at the junction of resistors **216*e*, 216*f*, 217*a* and 221*a* which occurs at the end of the trigger interval. This negative transient is coupled, by means of resistors 221*a*, 221*c* and 221*e* to the grid of the normally saturated vacuum tube 221*g*. Instantly, a positive transient occurs at the grid of normally cut off vacuum tube 221*h* due to the decrease in current in the resistor 221*b* and the resistive divider action of the resistors 221*d* and 221*f*. Tube 221*h* thereby is caused to saturate and by virtue of the high current in the resistor 221a and the divider action of the resistors 221*c* and 221*e*, tube 221*g* is effectively cut off. The conductor 221*k*, therefore, becomes highly positive with respect to ground and remains so until the negative transient at the completion of the decision interval coupled by means of resistors 220*e*, 221*b*, 221*d* and 221*f* cuts off tube 221*h* and reverses the bistable action of the stage 221. The waveform on conductor 221*k* is indicated as the Hold signal 221*m***, FIGURE 18*a* This hold control voltage may be used to cause holding or clamping of a sample at the sensor 1, FIGURE 2 during the analysis interval.

The function of the Look signal, waveform **217*m*** FIGURE 18*a* which appears on conductor **217*k*** is to provide a delay to permit analysis of the chromaticity and reflectance of the new sample.

During the sort interval, the waveform **218*m* appears on conductor 218*k* and when connected to conductor 193*k*** of the classifier FIGURE 16 may be used to provide the sort gate signal thereby identifying the sample just released to permit subsequent physical sorting by suitable conveying equipment.

The clear signal, appearing on conductor **219*k*, waveform 219*m*, is connected to the sorter conductor 98, FIGURE 9, and the reject storage conductor 98**, FIGURE 11, to cause return of these elements to their neutral or normal condition prior to the next decision.

The decision gate, on conductor **220*k*, waveform 220*m*, is connected to the grid 87*b* of the tube 87, FIGURE 9 and conductor 107*f***, FIGURE 11, to cause a decision to be reached concerning the shade of the sample being analyzed.

At the completion of the decision gate, the cycle is completed and the sample, by means of the decrease in voltage of the hold control signal on conductor **221*k***, is caused to be released to permit entry of a new sample.

The complete pattern of waveform at the various output conductors of the sequencer FIGURE 18 is shown in chart form in FIGURE 18*a*.

FIGURE 19 illustrates a preferred embodiment of the sensor portion of this invention in which the sensor 1 is shown positioned above a conveyor belt 227 on which a series of samples or objects move into the viewing area of the sensor 1. The console 228, illustrated in a preferred form in FIGURE 20, contains all of the components shown within the enclosure 228 on the block diagram FIGURE 1 and provides a convenient operating location for the setting and adjustment of the various controls as well as a protected housing for the components.

I have reduced the invention described herein to actual operating practice. The form of the operating apparatus is essentially as described. This apparatus has been completely tested and evaluated to prove its suitability for rapid, reliable sorting of production samples based on minute variations in chromaticity and reflectance of these samples.

It is obvious to anyone skilled in the art that many changes of detail, without departing from the spirit of my invention, may be made.

The samples shown as 5 on the conveyor belt 227 FIGURE 19 may be tile, brick, wood, cloth, vegetables or any other material desired.

I claim:

1. In colorimetry apparatus, in combination, means for illuminating an object, a first photosensitive device and a green filter therefor for receiving light from said object over the entire visible spectrum, a second photosensitive device and broad band-width blue filter therefor for receiving light from said object over a broad blue band-width of the visible spectrum, a third photosensitive device and a narrow band-width blue filter therefor for receiving light from said object over a narrow blue band-width of the visible spectrum, a fourth photosensitive device and a yellow-red filter therefor for receiving light from said object over the yellow-red portion of the visible spectrum, electrical circuit means connecting said photosensitive devices for providing summed electrical responses of the four said photosensitive devices, electrical means for obtaining a portion of said summed electrical responses of the aforesaid photosensitive devices to provide a first proportional electrical response, means for equating said first proportional electrical response to the electrical response of said first photosensitive device, means for determining the value of said first proportional electrical response, electrical means for obtaining another portion of said summed electrical responses of the aforesaid photosensitive devices to provide a second proportional electrical response, means for equating said second proportional electrical response to the summed electrical responses of said third and fourth photosensitive devices, and means for determining the value of said second proportional electrical response, said values representing coloration of said object.

2. Apparatus as described in claim 1, and including a fifth photosensitive device responsive to the total illumination of said object, electrical circuit means for obtaining an electrical response representative of said total illumination, means for obtaining an electrical response representing a portion of said total illumination electrical response to provide a third proportional electrical response, means for equating said third proportional electrical response to the electrical response of said first photosensitive device, and means for determining the value of said third proportional electrical response, said third electrical response value representing total visible reflectance of said object.

3. In colorimetry apparatus, means for illuminating an object, a first photosensitive device and a green filter therefor for passing light from said object to said photosensitive device over substantially the entire visible spectrum, a second photosensitive device and a broad band-width blue filter therefor for passing light from said object to said second photosensitive device over a broad blue band-width of the visible spectrum, a third photosensitive device and a narrow band-width blue filter therefor for passing light from said object to said third photosensitive device over a narrow blue band-width of the visible spectrum, a fourth photosensitive device and a yellow-red filter therefor for passing light from said object to said fourth photosensitive device over a yellow-red band-width of the visible spectrum, first electrical circuit means connected with said first photosensitive device for producing a first electrical response therefrom proportional to the visible spectrum illumination thereof, second electrical circuit means connected with said second photosensitive device for producing a second electrical response therefrom proportional to broad band-width blue illumination thereof, third electrical circuit means connected with said third photosensitive device for producing a third electrical response therefrom proportional to narrow band-width blue illumination thereof, fourth electrical circuit means connected with said fourth photosensitive device for producing a fourth electrical response therefrom proportional to yellow-red illumination thereof, other circuit means connected with the previously said circuit means for obtaining a total electrical response representing the summation of said electrical responses, means for obtaining a first proportional electrical response representing a proportion of said total electrical response, means for equating said first proportional electrical response to said first electrical response to obtain a color-indicating value, means for obtaining a second proportional electrical response representing another proportion of said total electrical response, and means for equating said second proportional electrical response to a response representing the summed responses of said third and fourth electrical responses to obtain another color-indicating value, said color-indicating values representing the coloration of said object.

4. Apparatus described in claim 1; said first photosensitive device and said green filter being, in combination, responsive to that portion of the visible spectrum substantially covering the range between 400 and 700 millimicrons wavelength and having a maximum response approximately at 550 millimicrons; said second photosensitive device and broad band-width blue filter therefor being, in combination, responsive to that portion of the visible spectrum substantially covering the range between 400 and 540 millimicrons and having maximum response at approximately 450 millimicrons; said third photosensitive device and narrow band-width blue filter therefor being, in combination, responsive to the portion of the visible spectrum substantially covering the range between 400 and 500 millimicrons and having maximum response at approximately 440 millimicrons; said fourth photosensitive device and filter therefor being, in combination, responsive to the portion of the visible spectrum substantially covering the range between 500 and 700 millimicrons and having maximum response at approximately 600 millimicrons.

5. Apparatus as described in claim 3, and including a fifth photosensitive device responsive to the total illumination of said object, electrical circuit means for obtaining an electrical response representative of said total illumination, means for obtaining an electrical response representing a portion of said total illumination electrical response to provide a third proportional electrical response, means for equating said third proportional electrical response to the response of said first photosensitive devce, and means for determining the proportional value of said third proportional electrical response, said third proportional value representing visible reflectance of said object.

6. In colorimetry apparatus, means for illuminating an object, a first photosensitive device and a green filter therefor for passing light from said object to said photosensitive device over substantially the entire visible spectrum, a second photosensitive device and a broad band-width blue filter therefor for passing light from said object to said second photosensitive device over a broad blue band-width of the visible spectrum, a third photosensitive device and a narrow band-width blue filter therefor for passing light from said object to said third photosensitive device over a narrow blue band-width of the visible spectrum, a fourth photosensitive device and a yellow-red filter therefor for passing light from said object to said fourth photosensitive device over a yellow-red band-width of the visible spectrum, first electrical circuit means connected with said first photosensitive device for producing a first electrical response therefrom proportional to the visible spectrum illumination thereof, second electrical circuit means connected with said second photosensitive device for producing a second electrical response therefrom proportional to broad band-width blue illumination thereof, third electrical circuit means connected with said third photosensitive device for producing a third electrical response therefrom proportional to narrow band-width blue illumination thereof, fourth electrical circuit means connected with said fourth photosensitive device for producing a fourth electrical response therefrom proportional to yellow-red illumination thereof, other circuit means connected with the previously said circuit means for obtaining a total electrical response representing the summation of said electrical responses, means for obtaining a first proportional electrical response representing a proportion of said total electrical response, means for equating said first proportional electrical response to said first electrical response to obtain a color indicating value, means for obtaining a second proportional electrical response representing a second proportion of said total electrical response and means for equating said second proportional electrical response to a response representing the summed responses of said third and fourth electrical responses to obtain another color-indicating value, said color-indicating values representing the coloration of said object, and including a fifth photosensitive device responsive to the total illumination of said object, electrical circuit means for obtaining an electrical response representative of said total illumination, means for obtaining an electrical response representing a portion of said total illumination electrical response to provide a third proportional electrical response, means for equating said third proportional electrical response to said first electrical response, means for determining a third proportional value of said third proportional electrical response, said third proportional value representing visible reflectance of said object, said determining means being settable for predetermined proportional values, first difference determining means to determine a first electrical difference response between said first electrical response and said first proportional electrical response, second difference determining means to determine a second electrical difference response between said summed responses of said third and fourth electrical responses and said second proportional electrical response, third difference determining means to determine a third electrical difference response between said first electrical response and said third proportional electrical response, said first and second electrical difference responses being representative of difference in coloration between said object and the coloration represented by said preset first and second proportional values, said third electrical difference response being representative of difference in reflectance between said object and the reflectance represented by said third proportional value.

7. Apparatus as described in claim 6, and electrical difference response magnitude detection means; switch means for connecting said first, second, and third difference determining means with said magnitude detection means for detecting the magnitudes of said first, second, and third electrical difference responses in various combinations; including means for adjusting the sensitivity of said magnitude detection means, and means connected with said magnitude detecting means for producing electrical magnitude difference electrical responses representative of the coloration and reflectance of said object as compared to the said preset proportional values.

8. Apparatus as described in claim 7, and including means for storing said electrical magnitude difference responses, and means for causing said storing means to release said electrical magnitude difference responses subsequently for utilization.

9. In colorimetry apparatus, means for illuminating an object, a plurality of photosensitive means and a plurality of color filter means associated therewith, first electrical circuit means connected with said photosensitive means to provide a plurality of electrical responses therefrom, second electrical circuit means connected with said first electrical circuit means for summing said electrical responses, third electrical circuit means for pre-setting electrical responses representing proportions of said summed responses, fourth electrical circuit means for comparing said preset electrical responses with said plurality of electrical responses to produce electrical difference responses representative of variations in coloration between said object and the coloration represented by said pre-set electrical responses, each of said photosensitive means performing a different color sensing function, additional photosensitive means responsive to illumination of said object, fifth electrical circuit means connected with said additional photosensitive means to provide an illumination intensity electrical response therefrom, sixth electrical circuit means for pre-setting an electrical response representing a proportion of said illumination intensity electrical response, means for comparing electrical responses from said photosensitive devices with said pre-set electrical responses to provide electrical difference responses, and adjustable magnitude detecting means for detecting the magnitudes of said electrical difference responses, and electrical circuit output means connected with said magnitude detecting means for producing electrical output responses.

10. Colorimetry apparatus as described in claim 9, and means for storing said difference responses, and means for releasing said difference responses from storage after predetermined intervals of time after being stored.

11. Colorimetry apparatus as described in claim 9, and means for storing said difference responses, means for releasing said difference responses from storage after predetermined intervals of time after being stored, and circuit means including manually settable switch means for electrically connecting said difference responses in various predetermined combinations.

References Cited in the file of this patent

UNITED STATES PATENTS

| | | |
|---|---|---|
| 2,483,452 | Berkley | Oct. 4, 1949 |
| 2,678,725 | Jacobson | Mar. 18, 1954 |
| 2,696,297 | Matthews | Dec. 7, 1954 |
| 2,720,811 | Sziklai | Oct. 18, 1955 |
| 2,802,390 | Nimeroff et al. | Aug. 13, 1957 |
| 2,869,415 | Kaye | Jan. 20, 1959 |
| 2,882,785 | Biesele | Apr. 21, 1959 |
| 2,910,909 | Stone et al. | Nov. 3, 1959 |

OTHER REFERENCES

"Photoelectric Difference Meter," Hunter, Journal of the Optical Society of America, vol. 48, No. 12, pages 985–995, December 1958.